United States Patent
Park et al.

(10) Patent No.: US 11,088,813 B2
(45) Date of Patent: Aug. 10, 2021

(54) METHOD FOR SIGNAL TRANSMISSION/RECEPTION BETWEEN TERMINAL AND BASE STATION IN WIRELESS COMMUNICATION SYSTEM, AND DEVICE SUPPORTING SAME

(71) Applicant: LG Electronics Inc., Seoul (KR)

(72) Inventors: Changhwan Park, Seoul (KR); Seonwook Kim, Seoul (KR); Joonkui Ahn, Seoul (KR); Sukhyon Yoon, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 35 days.

(21) Appl. No.: 16/489,164

(22) PCT Filed: Feb. 28, 2018

(86) PCT No.: PCT/KR2018/002456
§ 371 (c)(1),
(2) Date: Aug. 27, 2019

(87) PCT Pub. No.: WO2018/159999
PCT Pub. Date: Sep. 7, 2018

(65) Prior Publication Data
US 2020/0067690 A1    Feb. 27, 2020

Related U.S. Application Data

(60) Provisional application No. 62/625,278, filed on Feb. 1, 2018, provisional application No. 62/464,384, filed on Feb. 28, 2017.

(51) Int. Cl.
*H04L 5/14*    (2006.01)
*H04L 5/00*    (2006.01)
(Continued)

(52) U.S. Cl.
CPC .............. *H04L 5/14* (2013.01); *H04L 5/0048* (2013.01); *H04W 72/0453* (2013.01); *H04W 72/085* (2013.01)

(58) Field of Classification Search
CPC .......... H04W 8/005; H04W 4/46; H04W 4/40
See application file for complete search history.

(56) References Cited

U.S. PATENT DOCUMENTS

2016/0374080 A1   12/2016  Wei et al.
2018/0317198 A1*  11/2018  Lee ..................... H04W 68/005
(Continued)

FOREIGN PATENT DOCUMENTS

WO    WO2016208897    12/2016
WO    WO2017014602    1/2017

OTHER PUBLICATIONS

3rd Generation Partnership Project; Technical Specification Group Radio Access Network; "Evolved Universal Terrestrial Radio Access (E-UTRA); NB-IOT; Technical Report for BS and UE radio transmission and reception (Release 13)," 3GPP TR 36.802 V13.0.0, dated Jun. 2016, 59 pages.

(Continued)

*Primary Examiner* — Siming Liu
(74) *Attorney, Agent, or Firm* — Fish & Richardson P.C.

(57) ABSTRACT

A signal transmission/reception method comprising the steps of: receiving, from a base station, configuration information for configuring the operation of a terminal according to a first communication system; obtaining transmission power information on a downlink signal of the first communication system on the basis of the configuration information; and receiving the downlink signal from the base station on the basis of the transmission power information, wherein the downlink signal is transmitted via a downlink carrier of the first communication system, and the downlink carrier is allocated in an FDD mode in a guard-band between
(Continued)

an in-band and the guard-band configured for a second communication system.

11 Claims, 17 Drawing Sheets

(51) Int. Cl.
*H04W 72/04* (2009.01)
*H04W 72/08* (2009.01)

(56) References Cited

U.S. PATENT DOCUMENTS

2019/0349775 A1\* 11/2019 Sui .................. H04W 16/14
2020/0287638 A1\* 9/2020 Zhao ................ H04B 17/318

OTHER PUBLICATIONS

Ericsson, "On NB-IoT, eMTC and NR coexistence," R1-1703115, 3GPP TSG RAN1#88, Athens, Greece, dated Apr. 13-17, 2017, 8 pages.
PCT International Search Report and Written Opinion in International Application No. PCT/KR2018/002456, dated Jun. 20, 2018, 25 pages (with English translation).

\* cited by examiner

FIG. 9

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0-A (3,1) | D | D | D | | | | | | | | | | | U |
| 0-B (3,3) | D | D | D | | | | | | | | | U | U | U |
| 0-C (3,5) | D | D | D | | | | | | | U | U | U | U | U |
| 1-A (9,1) | D | D | D | D | D | D | D | D | D | | | | | U |
| 1-B (9,3) | D | D | D | D | D | D | D | D | D | | | U | U | U |
| 2-A (10,1) | D | D | D | D | D | D | D | D | D | D | | | | U |
| 2-B (10,3) | D | D | D | D | D | D | D | D | D | D | | U | U | U |
| 3-A (11,1) | D | D | D | D | D | D | D | D | D | D | D | | | U |
| 4-A (12,1) | D | D | D | D | D | D | D | D | D | D | D | D | | U |
| 5-A (3,2) | D | D | D | | | | | | | | | | U | U |
| 5-B (3,4) | D | D | D | | | | | | | | U | U | U | U |
| 5-C (3,6) | D | D | D | | | | | | U | U | U | U | U | U |
| 6-A (9,2) | D | D | D | D | D | D | D | D | D | | | | U | U |
| 6-A (9,4) | D | D | D | D | D | D | D | D | D | | U | U | U | U |
| 7-A (10,2) | D | D | D | D | D | D | D | D | D | D | | | U | U |
| 8-A (11,2) | D | D | D | D | D | D | D | D | D | D | D | | U | U |
| 9-A (6,2) | D | D | D | D | D | D | | | | | | | U | U |
| 9-B (6,4) | D | D | D | D | D | D | | | | | U | U | U | U |
| 9-C (6,6) | D | D | D | D | D | D | | | U | U | U | U | U | U |

Special subframe (1ms)

METHOD FOR SIGNAL TRANSMISSION/RECEPTION BETWEEN TERMINAL AND BASE STATION IN WIRELESS COMMUNICATION SYSTEM, AND DEVICE SUPPORTING SAME

CROSS-REFERENCE TO RELATED APPLICATIONS

This application is a National Stage application under 35 U.S.C. § 371 of International Application No. PCT/KR2018/002456, filed on Feb. 28, 2018, which claims the benefit of U.S. Provisional Application No. 62/625,278, filed on Feb. 1, 2018 and U.S. Provisional Application No. 62/464,384, filed on Feb. 28, 2017. The disclosures of the prior applications are incorporated by reference in their entirety.

TECHNICAL FIELD

The following description relates to a wireless communication system, and more particularly, to a method for signal transmission/reception between a terminal and a base station in a wireless communication system, and a device supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

In addition, Internet of Things (IoT) communication technology is newly proposed. Here, IoT refers to communication that does not involve human interaction. A way to introduce such IoT communication technology in a cellular-based Long Term Evolution (LTE) system is further under discussion.

The conventional LTE system has been designed to support high-speed data communication and thus has been regarded as an expensive communication technology for people. However, IoT communication technology can be widely used only if the cost is reduced.

Disclosure

Technical Problem

An object of the present invention is to provide a method of operating a first communication system (e.g., an NB-IoT system) in a guard-band of a band allocated to a second communication system (e.g., an LTE system).

Another object of the present invention is to provide a method for allocating a carrier of a first communication system according to an FDD scheme in a guard-band of a band allocated to a second communication system and a method for controlling transmit power of the carrier of the first communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method for signal transmission and reception between a terminal and a base station in a wireless communication system and devices supporting the same.

In one aspect of the present invention, provided herein is a method for transmitting and receiving, by a terminal, a signal to and from a base station in a wireless communication system, the method including receiving, from the base station, configuration information for configuring an operation of the terminal according to a first communication system, acquiring transmit power information about a downlink signal of the first communication system based on the configuration information, and receiving the downlink signal from the base station based on the transmit power information, wherein the downlink signal is transmitted through a downlink carrier of the first communication system, wherein the downlink carrier is allocated in a guard-band between an in-band and the guard-band configured for a second communication system, using a Frequency Division Duplex (FDD) scheme.

The first communication system may be a Narrowband Internet of Things (NB-IoT) system, and the second communication system may be a Long Term Evolution (LTE) system operating according to a Time Division Duplex (TDD) scheme.

The guard-band may include a low guard-band and a high guard-band, wherein each of the low guard-band and the high guard-band may include a first band, a second band, and a third band, wherein the second band may be a band for allocating carriers of the first communication system including the downlink carrier, the first band may be a guard-band configured between the second band and a band out of a band allocated to the second communication system, and the third band may be a guard-band configured between the second band and the in-band.

The carriers of the first communication system may include the downlink carrier and an uplink carrier, wherein the downlink carrier and the uplink carrier may be allocated to the low guard-band and the high guard-band, respectively, or may be allocated in the low guard-band or the high guard-band so as to be adjacent to each other.

The carriers of the first communication system may be sequentially allocated within the second band, starting at a frequency far from the in-band.

The configuration information may include at least one of uplink/downlink configuration information about the in-band, configuration information about a special subframe, transmission direction information about a signal of the first communication system, attribute information about a physical channel transmitted in the guard-band, a Coverage Enhancement (CE) level, and a Narrowband Reference Signal-Reference Signal Received Power (NRRS-RSRP).

The attribute information about the physical channel may include information about at least one of a type, a configuration, content, and a repetition number of the physical channel.

Transmit power of the downlink signal may be adjusted by the base station, wherein, when the second communication system is configured to operate on uplink in the in-band, transmit power of the downlink signal of the first communication system may be reduced in an inverse proportion to a spacing between the downlink carrier of the first communication system and the in-band.

The method may further include adjusting transmit power of the uplink signal of the first communication system based on the configuration information, and transmitting the uplink signal having the adjusted transmit power to the base station.

In another aspect of the present invention, provided herein is a method for transmitting, by a base station, a signal to a terminal in the wireless communication system, the method including transmitting, to the terminal, configuration information for configuring an operation of the terminal according to a first communication system, adjusting transmit power of a downlink signal of the first communication system based on the configuration information, and transmitting the downlink signal having the adjusted transmit power to the terminal, wherein the downlink signal is transmitted through a downlink carrier of the first communication system, wherein the downlink carrier is allocated in a guard-band between an in-band and the guard-band configured for a second communication system, using a Frequency Division Duplex (FDD) scheme.

In another aspect of the present invention, provided herein is a terminal for transmitting and receiving a signal to and from a base station in a wireless communication system, the terminal including a transceiver, and a processor operatively connected to the transceiver, wherein the processor is configured to control the transceiver to receive, from the base station, configuration information for configuring an operation of the terminal according to a first communication system, acquire transmit power information about a downlink signal of the first communication system based on the configuration information, and control the transceiver to receive the downlink signal from the base station based on the transmit power information, wherein the downlink signal is transmitted through a downlink carrier of the first communication system, wherein the downlink carrier is allocated in a guard-band between an in-band and the guard-band configured for a second communication system, using a Frequency Division Duplex (FDD) scheme.

In another aspect of the present invention, provided herein is a base station for transmitting a signal to a terminal in a wireless communication system, including a transmitter, and a processor operatively connected to the transmitter, wherein the processor is configured to control the transmitter to transmit, to the terminal, configuration information for configuring an operation of the terminal according to a first communication system, adjust transmit power of a downlink signal of the first communication system based on the configuration information, and control the transmitter to transmit the downlink signal having the adjusted transmit power to the terminal, wherein the downlink signal is transmitted through a downlink carrier of the first communication system, wherein the downlink carrier is allocated in a guard-band between an in-band and the guard-band configured for a second communication system, using a Frequency Division Duplex (FDD) scheme.

It is to be understood that both the foregoing general description and the following detailed description of the present disclosure are exemplary and explanatory and are intended to provide further explanation of the disclosure as claimed.

Advantageous Effects

According to various embodiments of the present invention, as a carrier of a first communication system is allocated according to an FDD scheme in a guard-band of a band allocated to a second communication system, the second communication system operating according to a TDD scheme may operate without restrictions.

Further, various embodiments of the present invention, interference between the first communication system and the second communication system may be reduced by adjusting and transmitting the transmit power of the first communication system allocated to the guard-band.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIGS. 9 to 12 are diagrams illustrating configuration of a special subframe according to various embodiments;

BEST MODE

Figure 1:
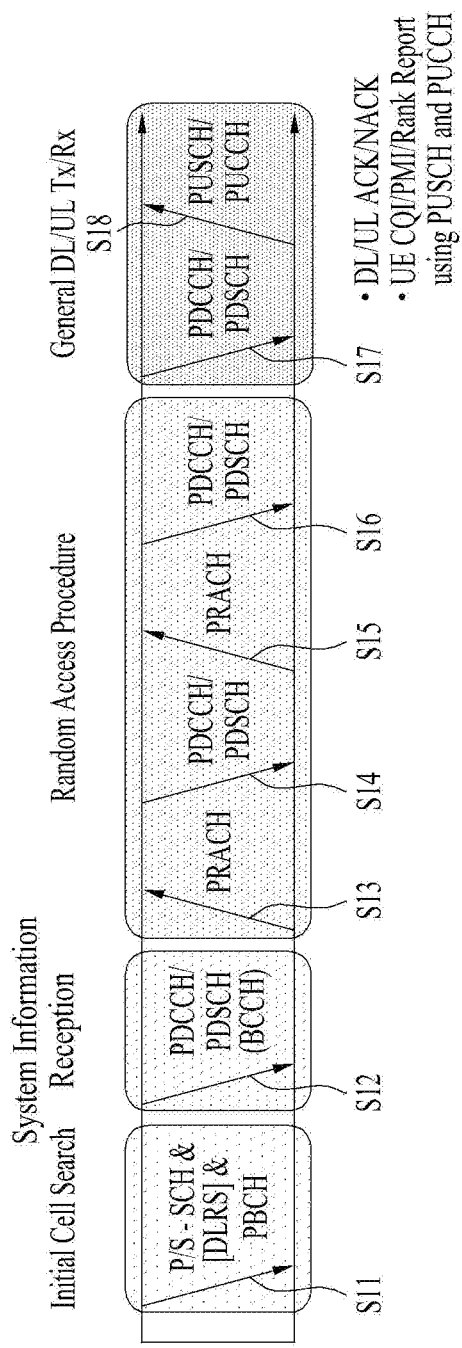
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB) an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR (New Radio system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1.3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
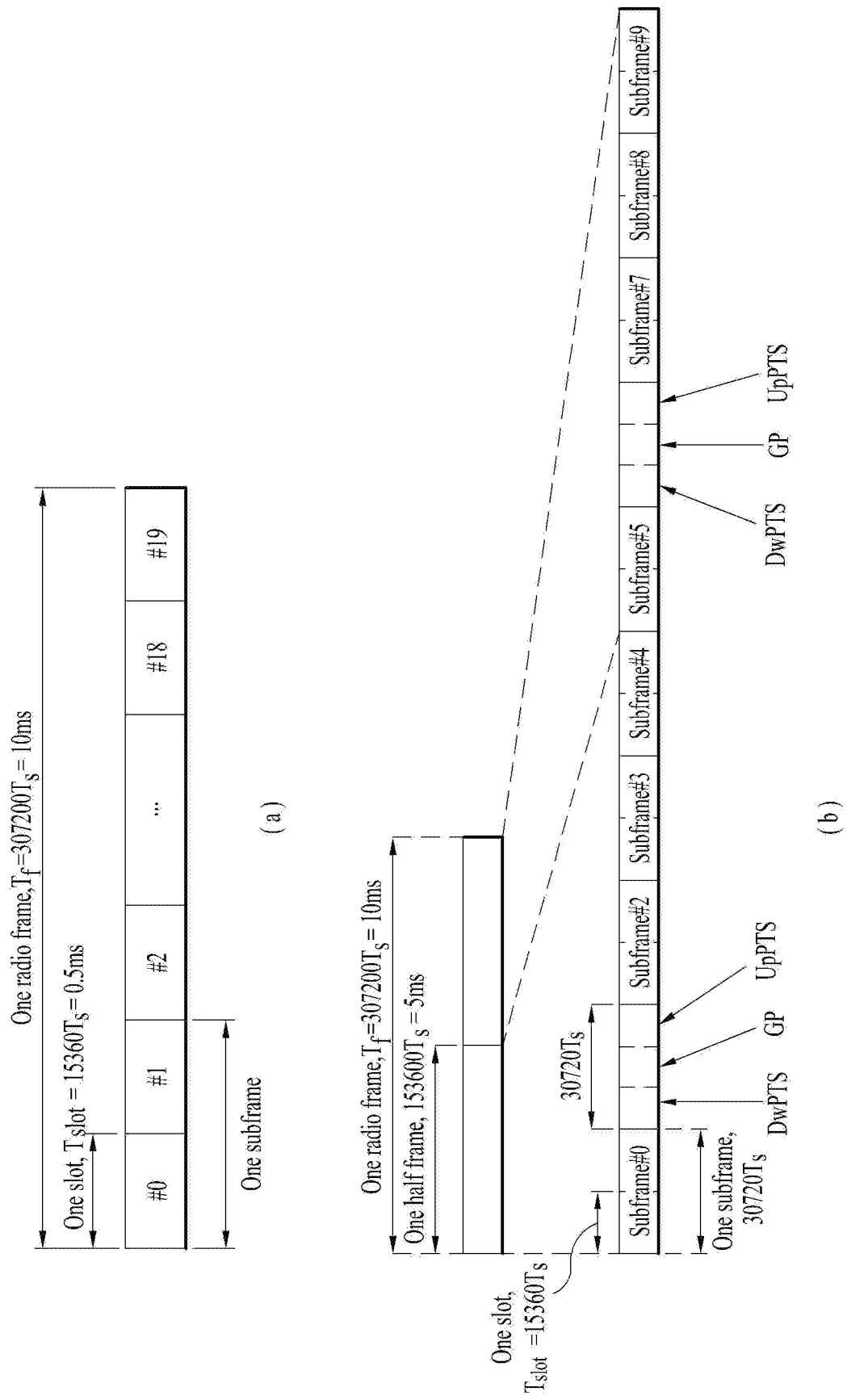
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An ith subframe includes 2ith and (2i+1)th slots each having a length of 0.5 ms ($T_{slot}=15360 \cdot T_s$). Ts is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In addition, in the LTE Release 13 system, the configuration of a special frame is established in consideration of X as shown in Table 2 below. In the LTE Release 14 system, special subframe configuration #10 is added. Here, X denotes the number of additional SC-FDMA symbols in the UpPTS and may be provided by a higher layer parameter srs-UpPtsAdd. If no parameter is configured, X is equal to 0. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.

data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | (1 + X) · 2192 · $T_s$ | (1 + X) · 2560 · $T_s$ | 7680 · $T_s$ | (1 + X) · 2192 · $T_s$ | (1 + X) · 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | (2 + X) · 2192 · $T_s$ | (2 + X) · 2560 · $T_s$ |
| 5 | 6592 · $T_s$ | (2 + X) · 2192 · $T_s$ | (2 + X) · 2560 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |
| 10 | 13168 · $T_s$ | 13152 · $T_s$ | 12800 · $T_s$ | — | — | — |

Figure 3:
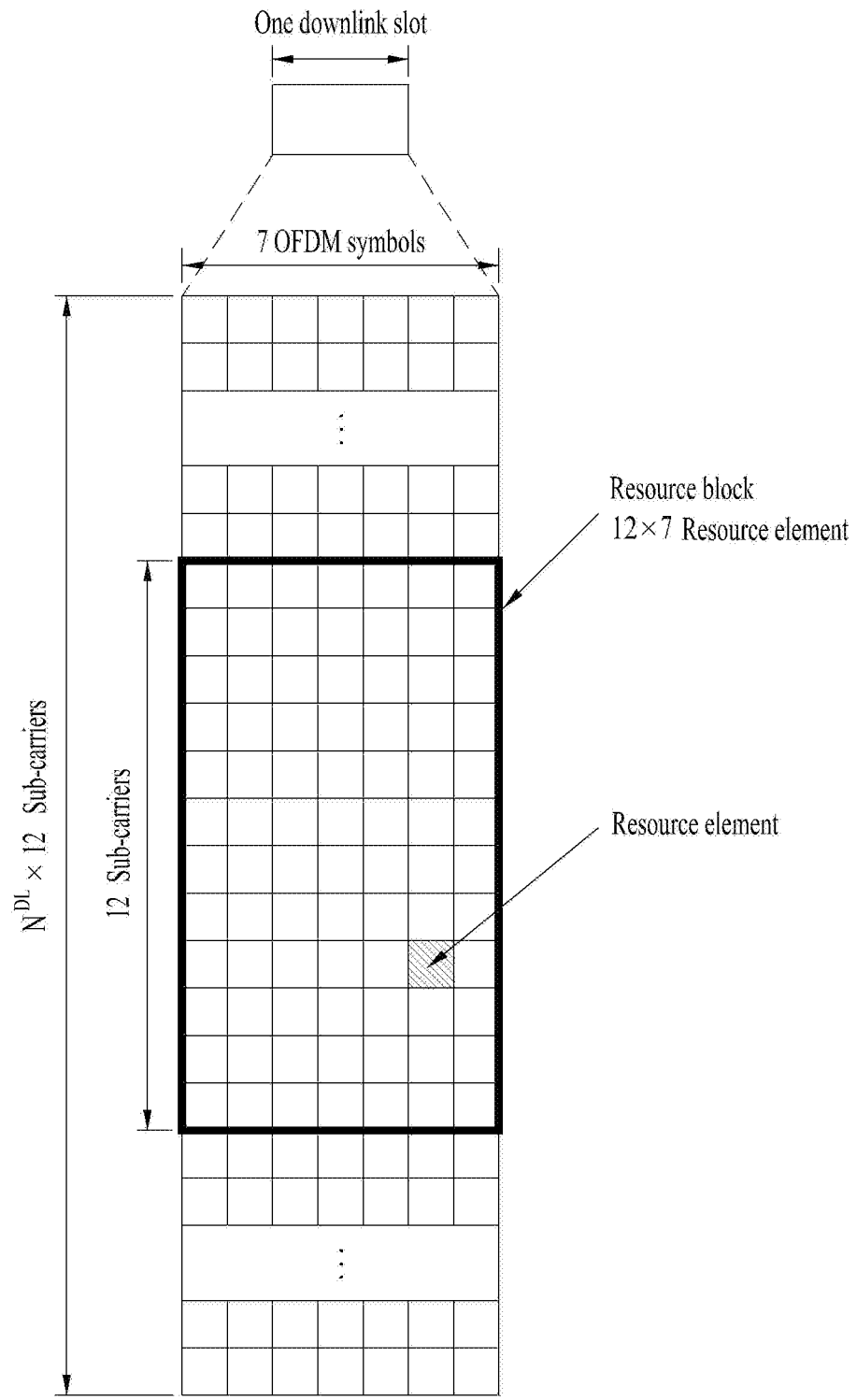
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
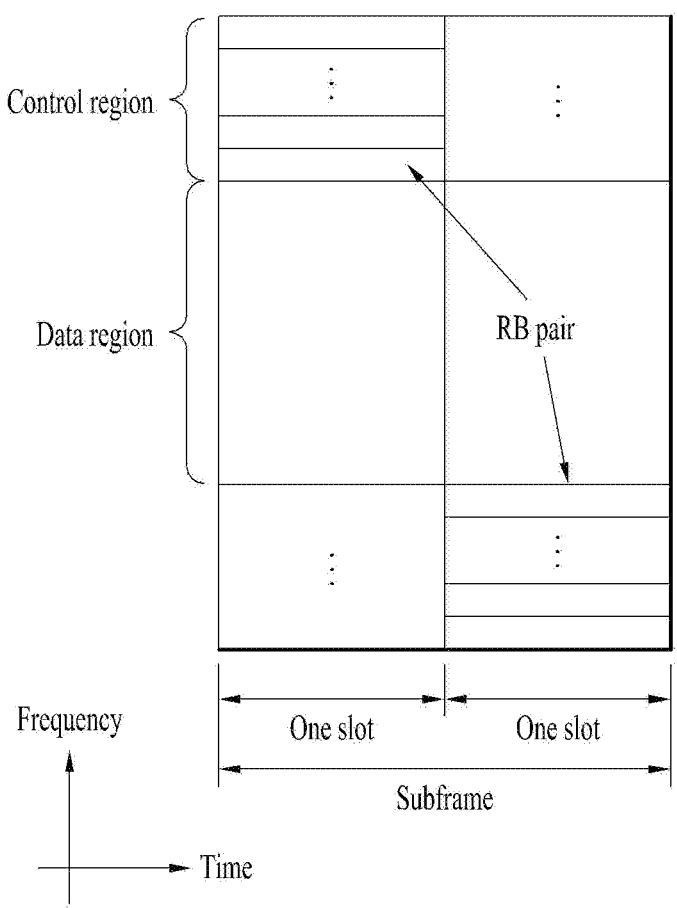
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
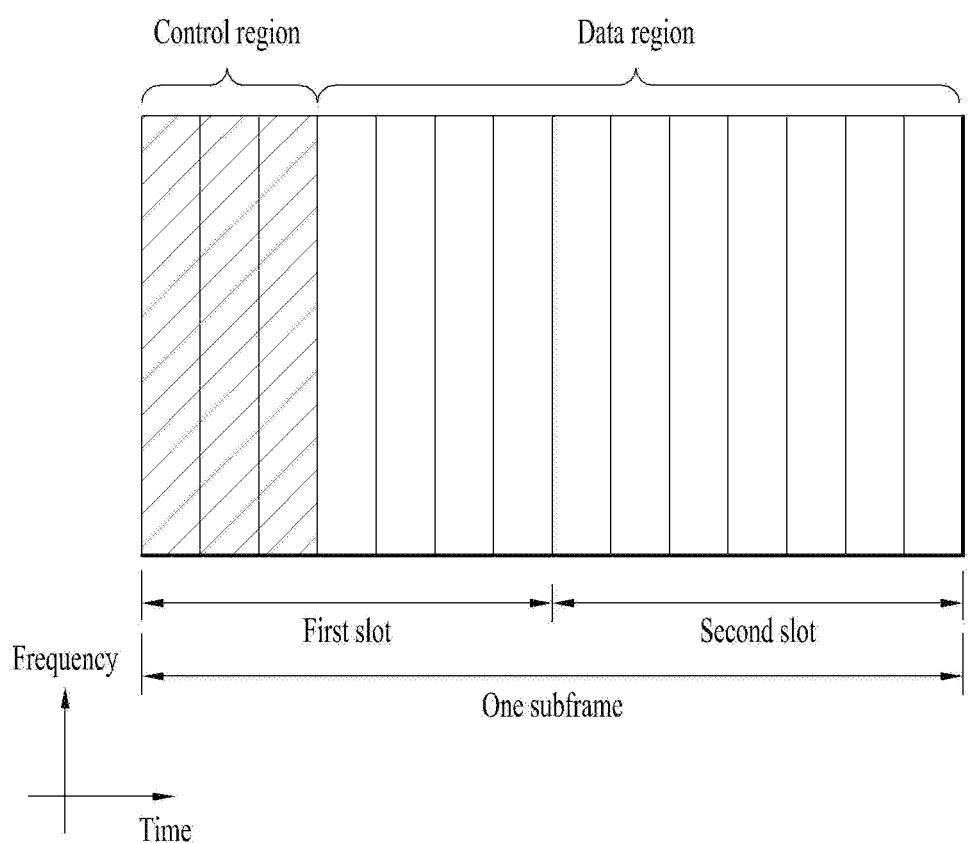
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a 2. New Radio Access Technology System As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

2.1. Numerologies

The NR system to which the present invention is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 3

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe,\mu} - 1\}$ and may also be numbered within a frame in ascending order like $n_{s,f}^\mu \in \{0, \ldots, N_{slot}^{frame,\mu} - 1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension.

Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame,\mu}$ | $N_{slot}^{subframe,\mu}$ |
|---|---|---|---|
| 2 | 12 | 40 | 4 |

3. Narrow Band-Internet of Things (NB-IoT)

Hereinafter, the technical features of NB-IoT will be described in detail. While the NB-IoT system based on the 3GPP LTE standard will be mainly described for simplicity, the same configurations is also applicable to the 3GPP NR standard. To this end, some technical configurations may be modified (e.g., subframe->slots)

Although the NB-IoT technology will be described in detail below based on the LTE standard technology, the LTE standard technology can be replaced with the NR standard technology within a range easily derived by those skilled in the art.

3.1. Operation Mode and Frequency

NB-IoT supports three operation modes of in-band, guard-band, and stand-alone, and the same requirements apply to each mode.

(1) In the in-band mode, some of the resources in the Long-Term Evolution (LTE) band are allocated to NB-IoT.

(2) In the guard-band mode, the guard frequency band of LTE is utilized, and the NB-IoT carrier is disposed as close to the edge subcarrier of the LTE as possible.

(3) In the stand-alone mode, some carriers in the Global System for Mobile Communications (GSM) band are separately allocated and operated.

An NB-IoT UE searches for an anchor carrier in units of 100 kHz for initial synchronization, and the anchor carrier center frequency of the in-band and the guard-band should be within ±7.5 kHz from a channel raster of 100 kHz channel. In addition, among the LTE PRBs, 6 middle PRBs are not allocated to NB-IoT. Therefore, the anchor carrier may only be positioned on a specific Physical Resource Block (PRB).

Figure 6:
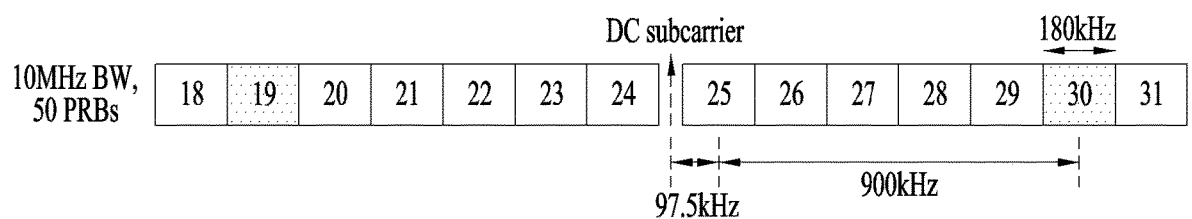
FIG. 6 is a diagram illustrating arrangement of in-band anchor carriers in an LTE system according to an embodiment.

FIG. 6 is a diagram schematically illustrating arrangement of an in-band anchor carrier for an LTE bandwidth of 10 MHz.

As shown in FIG. 6, a direct current (DC) subcarrier is positioned at a channel raster. Since the center frequency interval between adjacent PRBs is 180 kHz, PRB indexes 4, 9, 14, 19, 30, 35, 40 and 45 have center frequencies at ±2.5 kH from the channel raster.

Similarly, the center frequency of a PRB suitable for anchor carrier transmission is positioned at ±2.5 kHz from the channel raster in the case of a bandwidth of 20 MHz, and is positioned at ±7.5 kHz for bandwidths of 3 MHz, 5 MHz and 15 MHz.

In the guard-band mode, the PRB immediately adjacent to the edge PRB of LTE is positioned at ±2.5 kHz from the channel raster in the case of the bandwidths of 10 MHz and 20 MHz. In the case of 3 MHz, 5 MHz, and 15 MHz, the center frequency of the anchor carrier may be positioned at ±7.5 kHz from the channel raster by using the guard frequency band corresponding to the three subcarriers from the edge PRB.

The stand-alone mode anchor carriers are aligned with a 100-kHz channel raster, and all GSM carriers, including DC carriers, may be used as NB-IoT anchor carriers.

In addition, the NB-IoT supports operation of multiple carriers, and combinations of in-band+in-band, in-band+guard-band, guard-band+guard-band, and stand-alone+stand-alone may be used.

3.2. Physical Channel 3.2.1. Downlink (DL)

For the NB-IoT downlink, an Orthogonal Frequency Division Multiple Access (OFDMA) scheme with a 15 kHz subcarrier spacing is employed. This scheme provides orthogonality between subcarriers to facilitate coexistence with LTE systems.

On the downlink, physical channels such as a narrowband physical broadcast channel (NPBCH), a narrowband physical downlink shared channel (NPDSCH), and a narrowband physical downlink control channel (NPDCCH) are provided, and a narrowband secondary synchronization signal (NPSS), a narrowband primary synchronization signal (NSSS) and a narrowband reference signal (NRS) are provided as physical signals.

Figure 7:
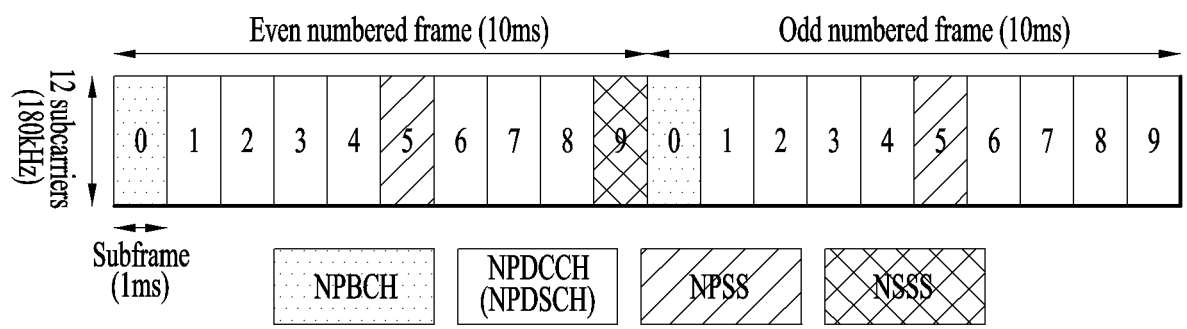
FIG. 7 is a diagram illustrating positions where a downlink physical channel and a downlink signal are transmitted in an LTE system operating using the FDD scheme according to an embodiment.

FIG. 7 is a diagram schematically illustrating positions where a physical downlink channel and a downlink signal are transmitted in an FDD LTE system.

The NB-IoT UE should acquire system information about a cell in order to access a network. To this end, synchronization with the cell should be obtained through a cell search procedure, and synchronization signals (NPSS, NSSS) are transmitted on the downlink for this purpose.

The NB-IoT UE acquires frequency, symbol, and frame synchronization using the synchronization signals and searches for 504 Physical Cell IDs (PCIDs). The LTE synchronization signal is designed to be transmitted over 6 PRB resources and is not reusable for NB-IoT, which uses 1 PRB.

Thus, a new NB-IoT synchronization signal has been designed and is to the three operation modes of NB-IoT in the same manner.

As shown in FIG. 7, the NPBCH is transmitted in the first subframe of each frame, the NPSS is transmitted in the sixth subframe of each frame, and the NSSS is transmitted in the last subframe of each even-numbered frame.

More specifically, the NPSS, which is a synchronization signal in the NB-IoT system, is composed of a Zadoff-Chu (ZC) sequence having a sequence length of 11 and a root index value of 5. Here, the NPSS may be generated according to the following equation.

$$d_l(n) = S(l) \cdot e^{-j\frac{\pi i n(n+1)}{11}}, \quad n = 0, 1, \ldots, 10$$ [Equation 1]

$$d(n) = b_q(m) e^{-j2\pi\theta_f n} e^{-j\frac{\pi i n'(n'+1)}{131}}$$ [Equation 2]

Here, the parameters in Equation 2 may be defined as follows.

TABLE 7

| variables | definition |
|---|---|
| n | 0, 1, ... , 131 |
| n' | n mod 131 |
| m | n mod 128 |
| u | $N_{ID}^{NCell}$ mod 126 + 3 |
| q | $\frac{N_{ID}^{NCell}}{126}$ |

The binary sequence bq(m) may be defined as shown in the following table, and the cyclic shift θf for the frame number of may be defined by the equation given below.

TABLE 8

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 -1 -1 1 -1 1 1 -1 -1 1 1 -1 1 -1 -1 1 -1 1 1 -1 1 -1 -1 -1 1 1 -1 -1 1 -1 1 1 -1 1 -1 -1 1 -1 1 1 1 -1 -1 1 1 1 -1 1 1 -1 -1 1 1 -1 1 1 -1 -1 1 -1 1 1 1 -1 1 -1 -1 1 1 -1 1 -1 -1 1 -1 1 1 1 -1 1 -1 -1 -1 1 1 -1 -1 1 1 -1 1 -1 -1 -1 1 1 -1 1 -1 -1 1 1 1 -1 -1 1 -1 1 1 -1 1 -1 -1 -1 1 1 -1 1 -1 -1 -1 1 -1 1 1 1 1 -1] |
| 2 | [1 -1 -1 1 -1 1 1 1 -1 -1 1 1 1 -1 1 -1 -1 1 1 -1 1 -1 -1 1 1 -1 1 -1 -1 1 -1 1 -1 1 1 -1 1 1 1 -1 -1 1 1 -1 1 -1 -1 1 1 1 -1 1 -1 -1 1 -1 1 -1 1 1 -1 1 1 -1 -1 1 -1 1 1 -1 1 1 -1 1 -1 -1 1 1 -1 1 -1 -1 -1 1 1 -1 1 -1 -1 1 -1 1 1 -1 -1 1 -1 1 1 1 -1 1 -1 -1 1 1 1 -1 1 1 -1 1 -1 -1 1 1 -1 1 -1 -1 1 -1 1 1 -1 1 1] |
| 3 | [1 -1 -1 1 -1 1 1 1 -1 -1 1 1 -1 1 -1 -1 1 -1 1 1 1 -1 -1 1 -1 1 1 -1 -1 1 1 1 -1 1 -1 -1 1 1 -1 1 -1 -1 1 1 -1 1 -1 -1 -1 1 1 1 -1 -1 1 -1 1 1 -1 -1 1 -1 1 -1 1 1 1 -1 -1 1 1 -1 1 -1 -1 1 1 1 -1 1 1 -1 1 -1 -1 -1 1 -1 1 1 -1 1 1 -1 -1 1 -1 1 1 1 -1 -1 1 1 -1 1 -1 -1 1 1 -1 1 -1 -1 -1 1 1 1 -1 -1 1 -1 1 1 -1 1 1 -1] |

Here, S(l) for symbol index l may be defined as shown in the following table.

TABLE 6

| Cyclic prefix length | S(3), . . . , S(13) |
|---|---|
| Normal | 1 1 1 1 -1 -1 1 1 1 -1 1 |

The NSSS, which is a synchronization signal in the NB-IoT system, is composed of a combination of a ZC sequence having a sequence length of 131 and a binary scrambling sequence such as a Hadamard sequence. In particular, the NSSS indicates a PCID to the NB-IoT UEs in the cell through the combination of the sequences.

Here, the NSSS may be generated according to the following equation.

$$\theta_f = \frac{33}{132}(n_f/2) \bmod 4$$ [Equation 3]

The NRS is provided as a reference signal for channel estimation necessary for physical downlink channel demodulation and is generated in the same manner as in LTE. However, NB Narrowband-Physical Cell ID (PCID) is used as the initial value for initialization.

The NRS is transmitted to one or two antenna ports, and up to two base station transmit antennas of NB-IoT are supported.

The NPBCH carries the Master Information Block-Narrowband (MIB-NB), which is the minimum system information that the NB-IoT UE should know to access the system, to the UE.

The transport block size (TBS) of the MIB-NB, which is 34 bits, is updated and transmitted with a periodicity of transmission time interval (TTIs) of 640 ms, and includes information such as the operation mode, the system frame number (SFN), the hyper-SFN, the cell-specific reference signal (CRS) port number, and the channel raster offset.

The NPBCH signal may be repeatedly transmitted 8 times in total to improve coverage.

The NPDCCH has the same transmit antenna configuration as the NPBCH, and supports three types of downlink control information (DCI) formats (For example, DCI N0, N1, N2). DCI N0 is used to transmit the scheduling information of the narrowband physical uplink shared channel (NPUSCH) to the UE, and DCIs N1 and N2 are used in transmitting information required for demodulation of the NPDSCH to the UE. Transmission of the NPDCCH may be repeated up to 2048 times to improve coverage.

The NPDSCH is a physical channel for transmission of a transport channel (TrCH) such as the downlink-shared channel (DL-SCH) or the paging channel (PCH). The maximum TBS is 680 bits and transmission may be repeated up to 2048 times to improve coverage.

3.2.2. Uplink (UL)

The uplink physical channels include a narrowband physical random access channel (NPRACH) and the NPUSCH, and support single-tone transmission and multi-tone transmission.

Multi-tone transmission is only supported for subcarrier spacing of 15 kHz, and single-tone transmission is supported for subcarrier spacings of 3.5 kHz and 15 kHz.

On the uplink, the 15-Hz subcarrier spacing may maintain the orthogonality with the LTE, thereby providing the optimum performance. However, the 3.75-kHz subcarrier spacing may degrade the orthogonality, resulting in performance degradation due to interference.

The NPRACH preamble consists of four symbol groups, wherein each of the symbol groups consists of a cyclic prefix (CP) and five symbols. The NPRACH only supports single-tone transmission with 3.75-kHz subcarrier spacing and provides CPs having lengths of 66.7 μs and 266.67 μs to support different cell radii. Each symbol group performs frequency hopping and the hopping pattern is as follows.

The subcarrier for transmitting the first symbol group is determined in a pseudo-random manner. The second symbol group hops by one subcarrier, the third symbol group hops by six subcarriers, and the fourth symbol group hops by one subcarrier hop. In the case of repeated transmission, the frequency hopping procedure is repeatedly applied. In order to improve the coverage, the NPRACH preamble may be repeatedly transmitted up to 128 times.

The NPUSCH supports two formats. Format 1 is for UL-SCH transmission, and the maximum transmission block size (TBS) thereof is 1000 bits. Format 2 is used for transmission of uplink control information such as HARQ ACK signaling. Format 1 supports single-tone transmission and multi-tone transmission, and Format 2 supports only single-tone transmission. In single-tone transmission, p/2-binary phase shift keying (BPSK) and p/4-QPSK (quadrature phase shift keying) are used to reduce the peak-to-average power ratio (PAPR).

3.2.3. Resource Mapping

In the stand-alone and guard-band modes, all resources included in 1 PRB may be allocated to the NB-IoT. However, in the in-band mode, resource mapping is limited in order to maintain orthogonality with the existing LTE signals.

The NB-IoT UE should detect NPSS and NSSS for initial synchronization in the absence of system information. Accordingly, resources (OFDM symbols 0 to 2 in each subframe) classified as the LTE control channel allocation region cannot be allocated to the NPSS and NSSS, and NPSS and NSSS symbols mapped to a resource element (RE) overlapping with the LTE CRS should be punctured.

Figure 13:
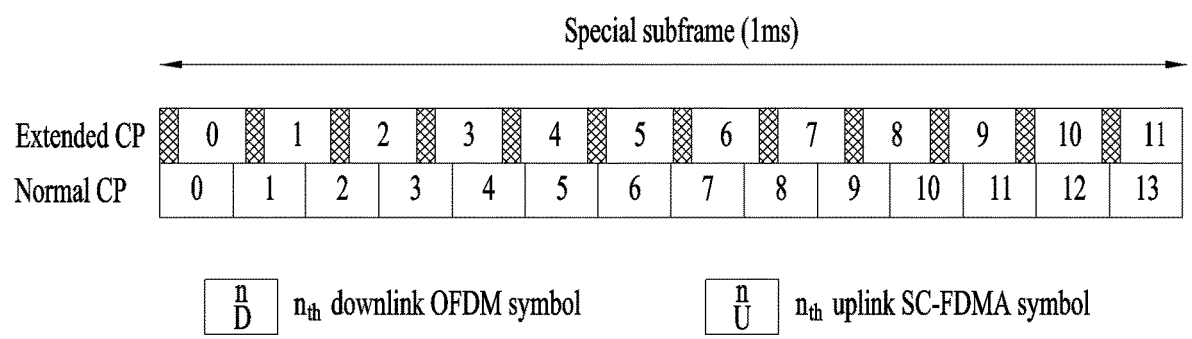
FIG. 13 is a diagram illustrating configuration of a subframe based on a CP length according to an embodiment.

FIG. 13 is a diagram illustrating exemplary resource allocation of an NB-IoT signal and an LTE signal in an in-band mode.

Figure 8:
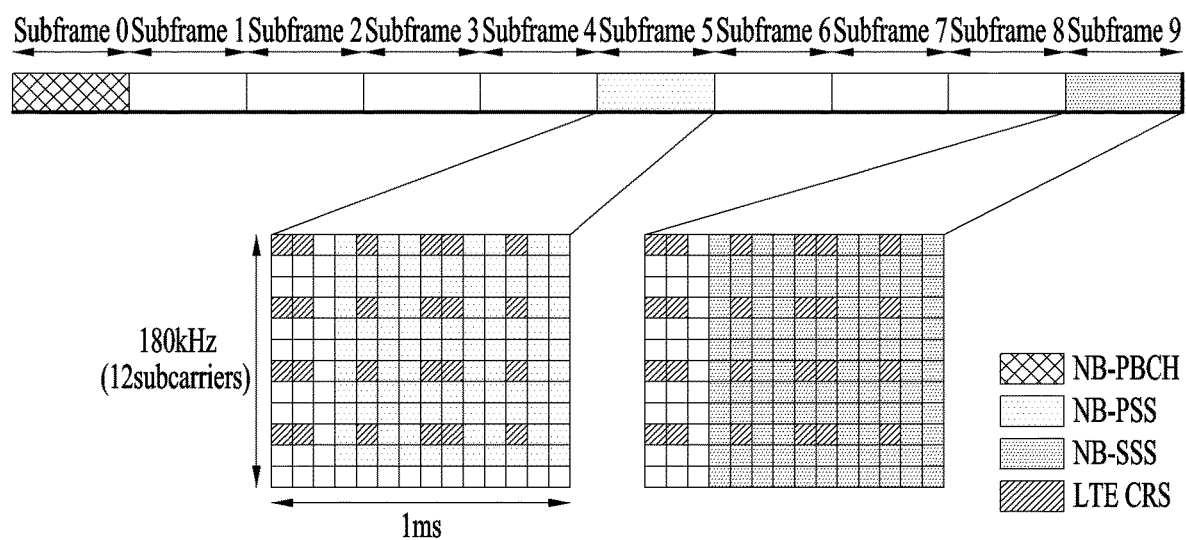
FIG. 8 is a diagram illustrating resource allocation to a signal of an NB-IoT system and a signal of an LTE system in an in-band mode according to an embodiment.

As shown in FIG. 8, for ease of implementation, the NPSS and NSSS are not transmitted on the first three OFDM symbols in the subframe corresponding to the transmission resource region for the control channel in the conventional LTE system regardless of the operation mode. REs for the common reference signal (CRS) in the conventional LTE system and the NPSS/NSSS colliding on a physical resource are punctured and mapped so as not to affect the conventional LTE system.

After the cell search, the NB-IoT UE demodulates the NPBCH in the absence of system information other than the PCID. Therefore, the NPBCH symbol cannot be mapped to the LTE control channel allocation region. Since four LTE antenna ports and two NB-IoT antenna ports should be assumed, the REs allocated to the CRS and NRS cannot be allocated to the NPBCH. Therefore, the NPBCH should be rate-matched according to the given available resources.

After demodulating the NPBCH, the NB-IoT UE may acquire information about the CRS antenna port number, but still may not know the information about the LTE control channel allocation region. Therefore, NPDSCH for transmitting System Information Block type 1 (SIB1) data is not mapped to resources classified as the LTE control channel allocation region.

However, unlike the case of the NPBCH, an RE not allocated to the LTE CRS may be allocated to the NPDSCH. Since the NB-IoT UE has acquired all the information related to resource mapping after receiving SIB1, the NPDSCH (except for the case where SIB1 is transmitted) and the NPDCCH may be mapped to available resources based on the LTE control channel information and the CRS antenna port number.

4. Proposed Embodiments

Hereinafter, the present invention will be described in more detail based on the technical ideas disclosed above.

The NB-IoT in the conventional LTE system is designed to be supportable only in the normal cyclic prefix (CP) of the frequency division duplex (FDD) system. For anchor-carriers on which the synchronization signals (e.g., the narrowband primary synchronization signal (NPSS), the narrowband secondary synchronization signal (NSSS), the master information block-narrow band (MIB-NB), and system information block type1-nb (SIB1-NB)) are transmitted, the transmission subframe position for each channel is fixed in the time domain as shown in the table given below.

TABLE 9

| | Subframe number | | | | | | | | | |
|---|---|---|---|---|---|---|---|---|---|---|
| | 0 | 1 | 2 | 3 | 4 | 5 | 6 | 7 | 8 | 9 |
| Even-numbered radio frame | NPBCH | | | | SIB1-NB | NPSS | | | | NSSS |
| Odd-numbered radio frame | NPBCH | | | | SIB1-NB | NPSS | | | | |

Here, the NPSS and NPBCH are transmitted in subframes 0 and 5 of each radio frame, respectively, while the NSSS is transmitted only in subframe 9 of an even-numbered radio frame. In addition, SIB1-NB (SystemInformationBlock-Type1-NB) may be transmitted over subframe 4 in every other frame within 16 consecutive radio frames, wherein the period and start position of the 16 radio frames may vary according to $N_{ID}^{Ncell}$ and schedulingInfoSIB1. However, even if subframes are not used for SIB-1NB transmission in a specific cell, SIB1-NB transmission may be performed in subframe 4 in another cell.

Therefore, it is required to transmit at least 4 DL subframes on the anchor-carrier for the NB-IoT service, and at least 5 DL subframes should be secured for the random access response and the CarrierConfigDedicated-NB transmission for the non-anchor carrier configuration.

On the other hand, in the TDD system, the number of DL subframes in a radio frame may be limited according to the UL/DL configuration, as shown in the table below.

TABLE 10

| Uplink-downlink configuration | Downlink-to-Uplink Switch-point periodictiy | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Here, D, U, and S denote downlink, uplink, and special subframe, respectively. For an eNB for which the Enhanced Interference Mitigation & Traffic Adaptation (eIMTA) feature is supported, a part of the UL subframes may be dynamically changed to DL subframes.

The DwPTS and the UpPTS are configured before and after a special subframe that is present between DL and UL intervals, respectively. The gap between the DwPTS and the UpPTS is used for downlink-to-uplink switching and timing advanced (TA).

As described above, the configuration of the OFDM or SC-FDMA symbol level in the special subframe may be represented as shown in FIGS. 9 to 12 according to the CP length of the downlink and uplink and the higher layer parameter srs-UpPtsAdd. Here, as described above, X (srs-UpPtsAdd) may not be set to 2 for special subframe configurations {3, 4, 7, 8} for normal CP in downlink and special subframe configurations {2, 3, 5, 6} for extended CP in downlink. In addition, X (srs-UpPtsAdd) may not be set to 4 for special subframe configurations {1, 2, 3, 4, 6, 7, 8} for normal CP in downlink and special subframe configurations {1, 2, 3, 5, 6} for extended CP in downlink.

FIG. 9 is a diagram illustrating special subframe configurations to which normal CP in DL and normal CP in UL are applied.

Figure 10:
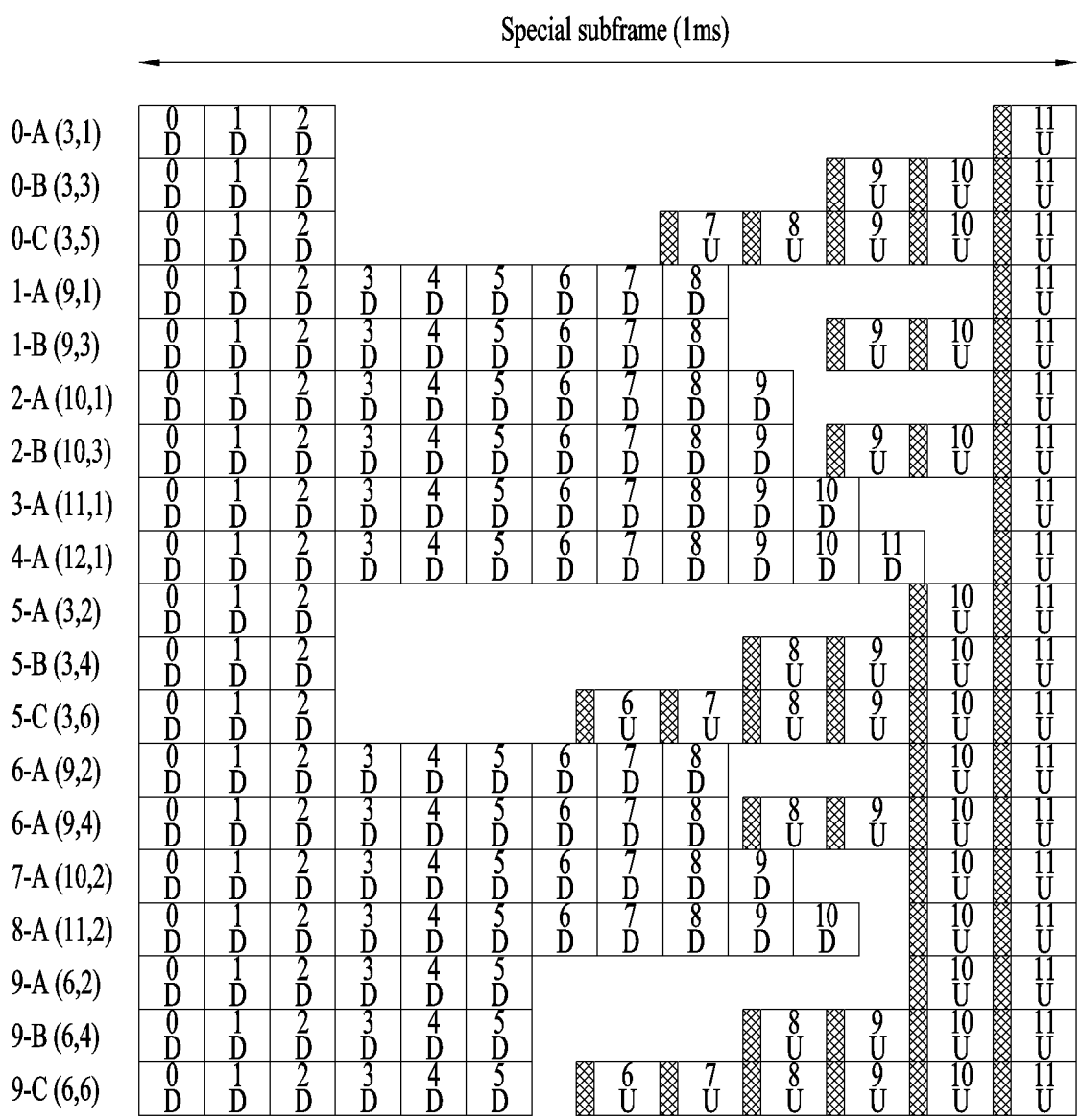

FIG. 10 is a diagram illustrating special subframe configurations to which normal CP in DL and extended CP in UL are applied.

Figure 11:
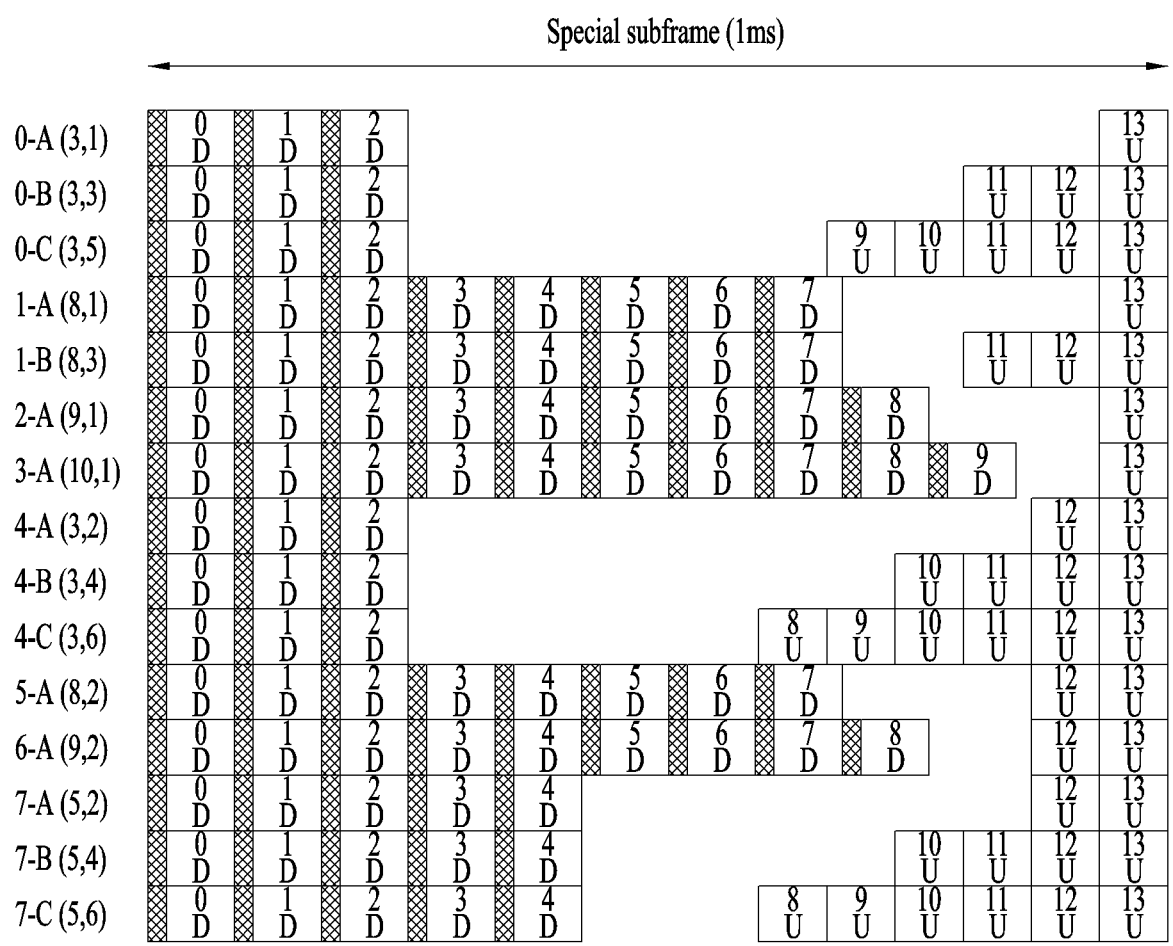

FIG. 11 is a diagram illustrating special subframe configurations to which extended CP in DL and normal CP in UL are applied.

Figure 12:
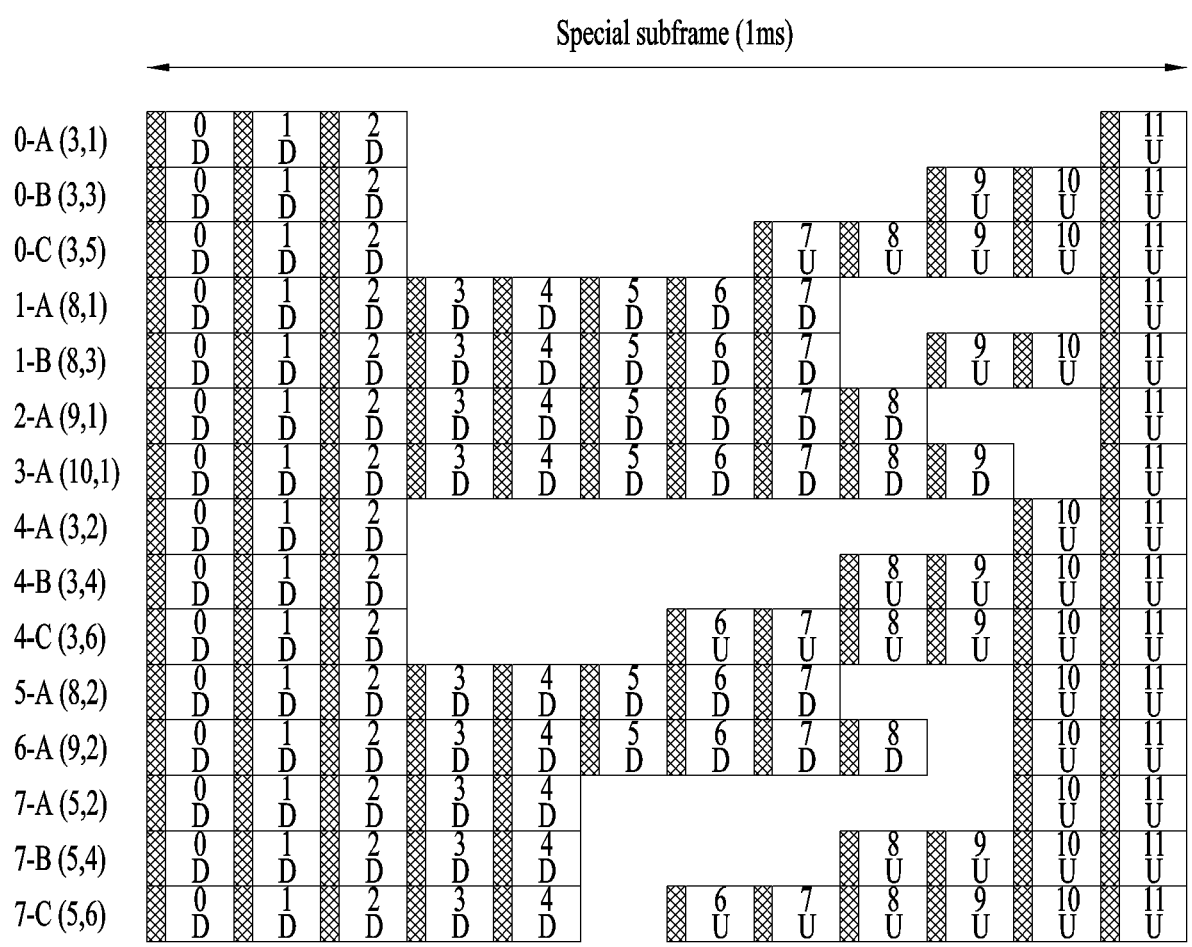

FIG. 12 is a diagram illustrating special subframe configurations to which extended CP in DL and extended CP in UL are applied.

FIG. 13 is a diagram illustrating subframe configuration and the meaning of notations according to the CP length in FIGS. 9 to 12.

As shown in FIG. 13, a subframe according to extended CP is composed of 12 symbols, and a subframe according to normal CP is composed of 14 symbols. Here, each DL symbol and UL symbol may be represented as shown at the bottom in FIG. 13. Hereinafter, it is assumed that the same structure as described above is applied to the present invention.

Here, it is assumed that the n-th downlink/uplink symbol of DwPTS/UpPTS and the index n of an additional downlink/uplink symbol conform to the index numbers of FIG. 18 for convenience of explanation and expression. That is, in each configuration, the starting index of n_U may not be 0.

In FIGS. 9 to 12, the null period of the DwPTS and UpPTS periods may be used as a DL-to-UL switching gap by the UE (e.g., the NB-IoT UE), and may be configured as about 20 usec, which is about ⅓ times shorter than the periodicity of the OFDM or SC-FDMA symbol. Also, n-A (x, y) in each row represents the default type of the n-th special subframe configuration having DwPTS and UpPTS periods including x and y OFDM and SC-FDMA symbols, and n-B (x,y+2) and n-C(x,y+4) represent special subframe configurations in which the number of SC-FDMA symbols is increased from the default type n-A (x, y) according to the value of X (srs-UpPtsAdd).

As described above, in the TDD system, the number of subframes fixed to downlink may vary according to the UL/DL configuration, and even the number of OFDM symbols fixed to downlink in the special subframe may vary according to the special subframe configuration.

However, when the eIMTA feature is supported, the eNB may be allowed to dynamically change a part of the uplink subframes to downlink subframes.

However, in the NB-IoT system, considering fixed scheduling of NPSS, NSSS, NPBCH, SIB1-NB, etc., it may not be preferable to always change a specific uplink subframe to a downlink subframe to use the eIMTA scheme. In addition, in the NB-IoT system in which four downlink subframes are already reserved for transmission of NPSS, NSSS, NPBCH, and SIB1-NB, it may be difficult to stably perform operation without restriction on uplink/downlink configuration. Further, for an NB-IoT service, restricting the uplink/downlink configuration of a UE operating in the legacy LTE system may be a considerable restriction on the degree of scheduling freedom of the BS.

Moreover, in the case of the NR system, there are more requirements for the TDD system than for the FDD system in consideration of a high frequency band and beamforming. Further, for the TDD of the NR system, a dynamic TDD or flexible duplex (or full duplex) transmission/reception scheme is under discussion. The dynamic TDD or flexible duplex (or full-duplex) transmission/reception scheme may not be suitable for services that consider a large number of consecutive transmissions in a specific direction (e.g., downlink or uplink) like mMTC or IoT (e.g., eMTC and NB IoT of the LTE system).

Accordingly, the present invention proposes a method for reducing constraints on TDD scheduling and the legacy LTE system by using a guard-band mode of the NB-IoT system operating according to the FDD scheme in the TDD guard-band. The proposed method may be applied to the NR system as well as the LTE system. In addition, the proposed method may be applied not only to the NB-IoT system but also to a service requiring half duplex and a large number of consecutive transmissions such as eMTC, and the like. However, the present invention is not limited thereto. For simplicity, the proposed method will be described mainly focusing an LTE system and a NB-IoT system operating in a TDD scheme.

In order for the TDD system to support the NB-IoT system, a structure supporting as many OFDM symbols as possible number or a downlink subframes that may be used according to combinations of various uplink/downlink configurations and special subframe configurations needs to be designed.

In order to design a structure of an anchor carrier of the NB-IoT system suitable for the TDD system, the followings may be considered.

1) Operation Mode

The NB-IoT system may support four operation modes including an In-band Same PCI mode, an In-band Different PCI mode, a guard-band mode, and a standalone mode. The operation mode of the anchor carrier may be transmitted in the MIB-NB of the NPBCH, and an NB-IoT UE needs a channel structure in which the UE can perform the same synchronization regardless of the operation mode until detecting and decoding the NPSS, NSSS, and NPBCH. Without such structure, blind detection and decoding according to the operation mode of the NB-IoT UE should be added, but this structure may not be suitable for the NB-IoT system, which is a feature of "low cost and long battery life."

2) Uplink/Downlink Configurations and Special Subframe Configurations

Referring to Table 10, downlink subframes available in common in all uplink/downlink configurations may be subframes 0 and 5, and subframe 1 may always be configured as a partial downlink subframe. Subframe 6 may be configured as a partial downlink subframe or a full downlink subframe depending on the uplink/downlink configuration. In this case, the full downlink subframe may represent a case where all symbols in the subframe are configured as downlink OFDM symbols. Accordingly, subframes that may be used as downlink subframes in any uplink/downlink configurations are subframes 0 and 5. In subframes 0 and 5, three OFDM symbols are configured for downlink regardless of the special subframe configuration.

3) Full Duplex Transmitter/Receiver

In the case where both downlink and uplink configurations are used simultaneously by distinguishing between in-band and guard-band on a spectrum, a full duplex scheme enabling transmission and reception at the same time is required. For example, if the NB-IoT UE transmits an uplink signal in a guard-band while the BS transmits a downlink signal in the TDD in-band for the legacy LTE system, the BS needs an RF module and a receiver capable of performing transmission and reception simultaneously. However, the legacy LTE UE does not need to receive the downlink signal transmitted by the BS to the NB-IoT UE. Similarly, the NB-IoT UE does not need to receive the downlink signal transmitted by the BS to the legacy LTE UE. Therefore, the full duplex scheme may be required only for the BS. Here, the legacy LTE UE may refer to a UE operating in the legacy LTE system or a UE supporting the legacy LTE system.

Figure 14:
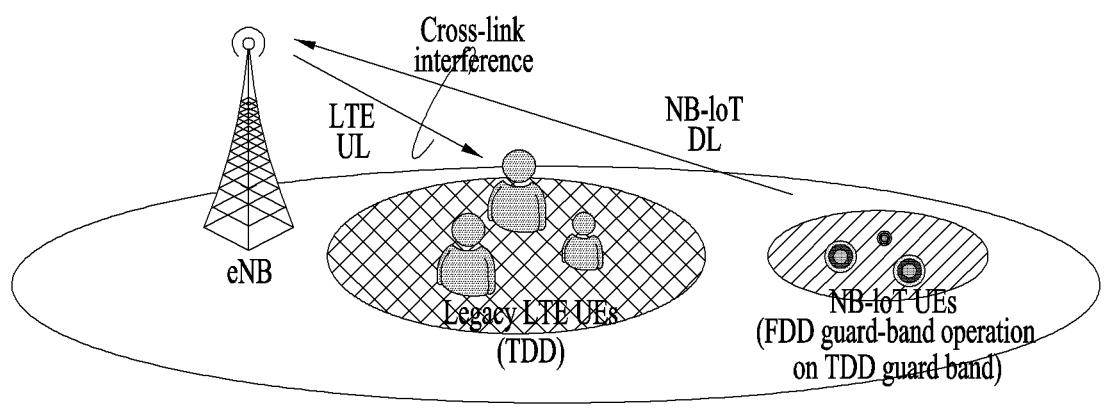
FIGS. 14 and 15 illustrate cross-link interference between an NB-IoT system and an LTE system according to an embodiment.
Figure 15:
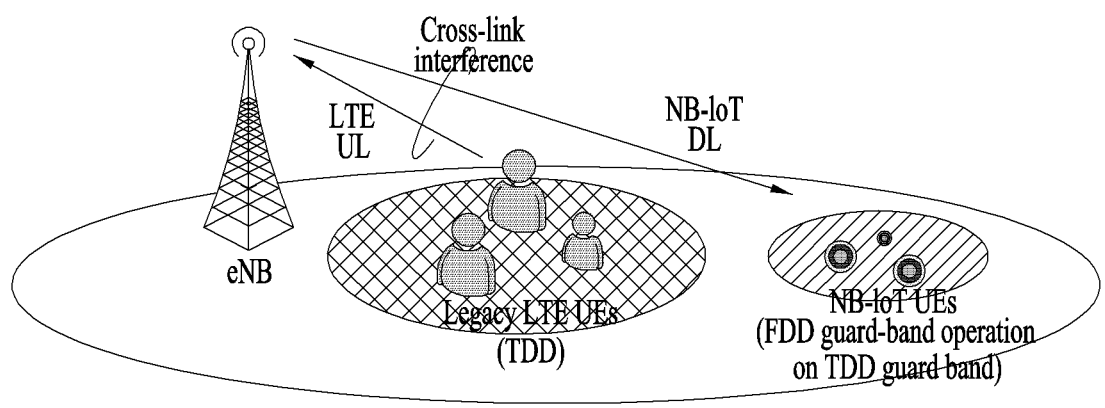

As shown in FIG. 14, from the perspective of the legacy LTE UE, the uplink signal of the NB-IoT UE may appear as cross-link interference such as in-band emission. In addition, as shown in FIG. 15, the uplink signal of the legacy LTE UE may appear as cross-link interference to the NB-IoT UE.

Accordingly, there is a need for a method to minimize cross-link interference that may occur between the legacy LTE UE and the NB-IoT UE.

Figure 16:
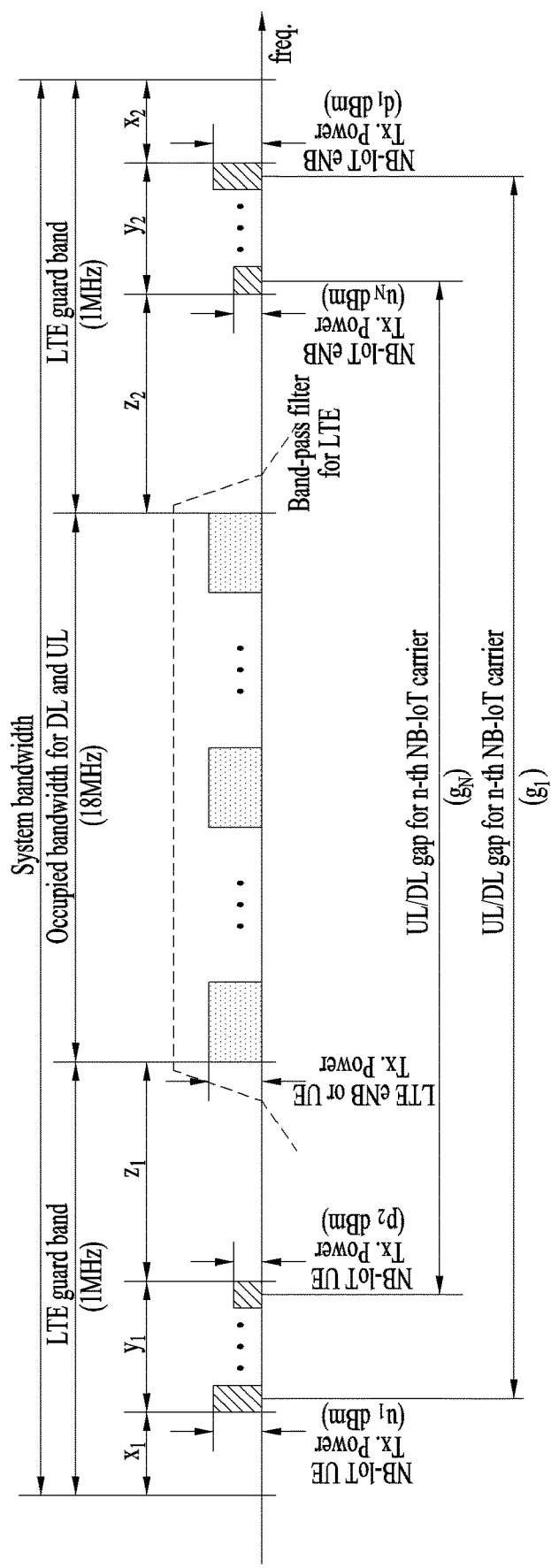
FIG. 16 illustrates resource allocation of an NB-IoT system operating in a guard-band according to an embodiment.

FIG. 16 illustrates resource allocation of an NB-IoT system operating in a guard-band according to an embodiment.

Referring to FIG. 16, the system bandwidth of the LTE system may be 20 MHz, and each of the low/high guard-bands except for the in-band of 18 MHz may be 1 MHz. However, embodiments are not limited thereto. The channel bandwidth of the NB-IoT system is 180 kHz, and the number of carriers of the NB-IoT system allocable to each of the low guard-band and the high guard-band is shown in Table 11.

TABLE 11

| Bandwidth | Occupied in-band bandwidth | Lower guard-band bandwidth | Max. number of NB-IoT carriers in the lower guard-band |
| --- | --- | --- | --- |
| 1.4 MHz | 1.08 MHz | 160 kHz | — |
| 3 MHz | 2.7 MHz | 150 kHz | — |
| 5 MHz | 4.5 MHz | 250 kHz | 1 |
| 10 MHz | 9 MHz | 500 kHz | 2 |
| 15 MHz | 13.5 MHz | 750 kHz | 4 |
| 20 MHz | 18 MHz | 1 MHz | 5 |

In FIG. 16, the following symbols are shown.

$x_1$ and $x_2$ denote guard-bands that are needed to reduce the effect of the Adjacent Channel Leakage Ratio (ACLR) on out-of-band in the low/high TDD guard-bands, respectively.

$y_1$ and $y_2$ denote bandwidths to which a plurality of NB-IoT channels may be allocated in the low guard-band and the high guard-band, respectively, and an additional guard-band may be allocated between NB-IoT channels having a bandwidth of 180 kHz to reduce the effect of in-band emission.

$z_1$ and $z_2$ denote additional guard-bands for reducing the effect of in-band emission between the TDD in-band and the NB-IoT carrier in the low guard-band and the high guard-band, respectively.

$g_n$ denotes a frequency gap between n-th uplink and downlink NB-IoT carriers among the N uplink/downlink NB-IoT carriers.

$u_n$ denotes the UE transmission power of the n-th uplink NB-IoT carrier among the N uplink NB-IoT carriers.

$d_n$ denotes the eNB transmission power of the n-th downlink NB-IoT carrier among the N downlink NB-IoT carriers.

Here, the NB-IoT carrier may be referred to as a carrier of the NB-IoT system according to an embodiment, and may represent a carrier used for signal transmission and reception between a BS and a UE in the NB-IoT system.

4.1. First Proposal: "NB-IoT Carrier Allocation Method"

The guard-band bandwidths of the same size may be configured for the low guard-band and the high guard-band. Referring to FIG. 16, each of $y_1$ and $y_2$ may be configured for an uplink or downlink NB-IoT band, or NB-IoT downlink and uplink carriers may be configured in pair and allocated within $y_1$ or $y_2$ so as to be adjacent to each other. While NB-IoT downlink and uplink carriers should be configured in pair in the case of the NB-IoT anchor carriers, non-anchor downlink and uplink carriers may be asymmetrically configured in terms of the number thereof. The method of configuring NB-IoT carriers may be summarized as follows.

4.1.1 Configuring a Low Frequency Band and a High Frequency Band as an Uplink (or Downlink) NB-IoT Band and a Downlink (or Uplink) NB-IoT Band, Respectively Once $x_1$ and $x_2$ for minimizing the effect of the ACLR are defined, the NB-IoT anchor carriers may sequentially occupied frequencies starting with the outermost frequency (with an uplink/downlink gap similar to the case of the PUCCH) within $y_1$ and $y_2$ satisfying $x_1$ and $x_2$ in order to minimize cross-link interference applied to the legacy in-band LTE system by in-band emission. Here, the E-UTRA Absolute Radio Frequency Channel Number (EARFCN) of the uplink anchor carrier paired with the downlink anchor carrier may be defined differently from the conventional cases, and the definition requires information about the system bandwidth of the legacy LTE system including the corresponding guard-band. However, even if the NB-IoT UE decodes MIB1-NB and SIB1-NB, the NB-IoT UE may not recognize the information about the system bandwidth of the legacy LTE system to which the anchor carrier belongs. Therefore, information necessary to acquire the EARFCN of the uplink carrier needs to be included in MIB1-NB, SIB1-NB, or SIB2-NB before the uplink random access procedure. In order to acquire the EARFCN of the uplink anchor carrier, MIB1-NB, SIB1-NB, or SIB2-NB may include at least one of the following pieces of information a to f:

a. System bandwidth of the LTE system or related information;
b. $x_1$ or $x_2$, or related information;
c. $y_1$ or $y_2$, or related information;
d. Relative position of the anchor carrier within $y_2$ (or $y_1$), or related information;
e. $z_1$ or $z_2$, or related information; and
f. Downlink/uplink offset needed to derive the uplink EARFCN or related information.

As another method of configuring NB-IoT downlink and uplink carriers in pair when $x_1$, $x_2$, and $z_1$ and $z_2$ for minimizing the ACLR and the cross-link interference applied to the legacy in-band LTE system by in-band emission are already defined, the uplink (or downlink) anchor carrier and the downlink (or uplink) anchor carrier may be configured within $y_1$ and $y_2$ so as to maintain a constant offset (an uplink/downlink gap similar to the case of FDD). In this case, information similar to the method of the NB-IoT anchor carriers sequentially occupying frequencies starting with the outermost frequency is needed in order to acquire the EARFCN of the uplink anchor carrier, but the information about the relative positions of the anchor carriers within $y_2$ (or $y_1$) is not needed.

4.1.2 Allocating NB-IoT Uplink and Downlink Carriers in the Low Guard-Band and High Guard-Band in a Crossed Manner This method is similar to the allocation method of 4.1.1 described above. However, in this method, uplink and downlink carriers are configured within $y_1$ or $y_2$ so as to be adjacent to each other or to have a constant offset. The allocation method according to 4.1.2 is advantageous in that only the offset information about the uplink and downlink anchor carriers is needed to acquire the EARFCN of the uplink anchor carrier.

4.2. Second Proposal: "Information Delivery Method for Acquiring the EARFCN of the Uplink Anchor Carrier"

In the existing paired-spectrum FDD band, the EARFCN relationship with the downlink and uplink anchor carriers is defined regardless of the operation mode of the NB-IoT system. However, in the case where operation is performed in the NB-IoT FDD guard-band mode in the TDD guard-band, a new definition is needed because the EARFCN relationship with the downlink and uplink anchor carriers is not defined.

After detecting the anchor carrier, the NB-IoT UE may identify the operation mode and the scheduling information about the SIB1-NB by decoding MIB1-NB. In addition, by acquiring the SIB2-NB scheduling information through decoding of the SIB1-NB, the NB-IoT UE may acquire NPRACH-related information. Therefore, after detecting the downlink anchor carrier, the NB-IoT UE may decode the MIB1-NB, SIB1-NB, and SIB2-NB and additional decode the SIB3-NB, SIB4-NB, SIB5-NB, SIB14-NB, and SIB16-NB until transmission on the first uplink anchor carrier. However, the SIB5-NB, SIB4-NB, SIB5-NB, SIB14-NB, and SIB16-NB are already designated for specific use, and may be excessively frequently transmitted to deliver information indicating the EARFCN of the uplink anchor carrier. Accordingly, spare bits of the existing MIB1-NB, SIB1-NB, and SIB2-NB may be used, or a new SIB type may be defined. Here, if the newly defined SIB type is not in the TDD guard-band mode, transmission thereof may be omitted.

In addition, when the MIB1-NB is used to announce the EARFCN of the uplink anchor carrier, the 11 spare bits and the 3 spare bits of Guardband-NB-r13 included in operationModeInfo-r13 may be used together to include up to 14-bit information.

In the case where the EARFCN information about the uplink anchor carrier is included in the SIB1-NB, the code rate, period and number of repetitions of the SIB1-NB may be adjusted according to the amount of information included in the SIB1-NB, using schedulingInfoSIB1-r13 of the MIB1-NB. When EARFCN information about the uplink anchor carrier is included in SIB2-NB, the EARFCN may be explicitly designated using ul-CarrierFreq, which is included in freqInfo-r13.

4.3. Third Proposal: "Method for Transmission Power Control of NB-IoT Downlink and Uplink"

As shown in FIG. 16, when the NB-IoT guard-band mode operation in the FDD scheme is employed in the TDD guard-band, cross-link interference may occur as shown in FIGS. 14 and 15. The cross-link interference may be reduced by properly allocating the guard-bands of $z_1$ and $z_2$. However, the effects of the in-band emission and cross-link interference may vary with the relative positions of the uplink (or downlink) and downlink (or uplink) NB-IoT carriers within $y_1$ and $y_2$.

In order to more effectively reduce the effects of the in-band emission and cross-link interference, downlink and uplink powers may be additionally controlled in the in-band according to the uplink/downlink configurations in Table 10, beside the transmit power control of NB-IoT carriers. For example, controlling the downlink and uplink powers may include controlling transmit powers of downlink and uplink signals. In addition, in order to reduce the effect of the cross-link interference of the NB-IoT carriers, the transmit power of the legacy in-band LTE system may be controlled differently. In this case, for further power control for reducing the effect of the cross-link interference, the following elements a to f may be considered.

a. In-band uplink/downlink configurations and special subframe configurations
b. NB-IoT transmit direction of the guard-band
c. Type, configuration, and content of an NB-IoT physical channel
d. Repetition of an NB-IoT physical channel
e. Spacing between NB-IoT carriers of the in-band and guard-band f. NB-IoT Coverage Enhancement (CE) level or Narrowband Reference Signal-Reference Signal Received Power (RSRP) (or path loss)

For example, when the transmit direction of the legacy in-band LTE system is the same as the transmit direction of the NB-IoT system, the uplink and downlink signals may be transmitted without additional power control. Of course, even in this case, additional downlink and uplink power control for the NB-IoT UE operating in the guard-band may be performed according to the structures of the in-band and guard-band transmission/reception filters of the BS. For example, the additional power control may be performed by setting an additional offset applied to $P_{CMAX}$ or $P_{CMAX,c}$ or setting an additional offset applied to the maximum uplink transmit power $P_{EMAX}$ or $P_{EMAX,c}$.

On the other hand, when the legacy in-band LTE system is on downlink, the uplink transmit power of the NB-IoT system may be reduced in inverse proportion to the NB-IoT carrier spacing of the in-band and guard-band. For example, for a wider spacing between the NB-IoT carriers of the in-band and the guard-band, lower uplink transmit power of the NB-IoT system may be set. In this case, the transmit power may be controlled differently according to the type of NB-IoT uplink channel (e.g., NPRACH, NPUSCH format 1, NPUSCH format 2, single-carrier, or multi-carrier). Similarly, when the legacy in-band LTE system is on uplink, the downlink transmit power of the NB-IoT system may be reduced in inverse proportion to the NB-IoT carrier spacing between the in-band and the guard-band. For example, for a wider spacing between NB-IoT carriers of in-band and guard-band, lower downlink transmit power of the NB-IoT system may be set.

In addition, the number of downlink (or uplink) repetitions may be increased in proportion to the additionally applied downlink (or uplink) transmit power control. However, considering that the uplink channel of the legacy in-band LTE system that is affected by the largest cross-link interference from the downlink of the NB-IoT system is PUCCH, the degree of additional uplink transmit control of the NB-IoT system may vary when the legacy in-band LTE system is on downlink. For example, when legacy in-band LTE system is on downlink, the additionally controlled uplink transmit power of the NB-IoT system may be further reduced. In this case, the power control may be performed differently according to the type of the NB-IoT downlink physical channel, the search space and type of the NPDCCH, and the content of the NPDSCH (e.g., UE data or SIB). Here, in the case where the same channel is repeated, when the power control is changed on the same channel that is repeated, it is necessary to share parameters for the changed power control such that no misunderstanding occurs between the BS and the UE. For example, the parameters related to power control may include, but not limited to, at least one of an in-band uplink/downlink configuration, a special subframe configuration, an additional offset applied to $P_{CMAX}$ or $P_{CMAX,c}$, an additional offset applied to $P_{EMAX}$ or $P_{EMAX,c}$, and an increase or decrease of the number of repetitions when additional power control is performed.

In addition, the parameters related to power control may be transmitted cell-specifically or UE-specifically, and may be differently applied according to the CE-level or NRS-RSRP. In particular, the maximum uplink transmit power of the NB-IoT UE may be configured differently for the case where the in-band LTE system is on uplink and the case where the in-band LTE system is on downlink. The cell-specifically transmitted parameters may be delivered through MIB1-NB, SIB1-NB, or SIB2-NB, or may be delivered through a new SIB. In addition, when the information about the position and bandwidth of the center carrier of the in-band LTE system is provided to the NB-IoT UE, the NB-IoT UE may recognize the spacing between the in-band anchor carrier and the NB-IoT anchor carrier (or non-anchor carrier). The information about the position and bandwidth of the center carrier of the in-band LTE system may be delivered through MIB1-NB, SIB1-NB, SIB2-NB, or a newly added SIB, or may be delivered through RRC.

In the case where the transmit power and resource allocation varies according to the CE level of the NB-IoT UE, the positions available to the anchor carrier and the non-anchor carrier within $y_1$ and $y_2$ may be limited as shown in Table 12 below, according to the CE level, the system bandwidth of Table 10, and $z_1$ and $z_2$ shown in FIG. 16.

TABLE 12

| Bandwidth | Occupied in-band bandwidth | Lower guard-band bandwidth | Max. number of NB-IoT carriers in the lower guard-band | Allowed Max. CE level from the outmost guard-band |
| --- | --- | --- | --- | --- |
| 1.4 MHz | 1.08 MHz | 160 kHz | — | — |
| 3 MHz | 2.7 MHz | 150 kHz | — | — |
| 5 MHz | 4.5 MHz | 250 kHz | 1 | 0 |
| 10 MHz | 9 MHz | 500 kHz | 2 | 1, 0 |
| 15 MHz | 13.5 MHz | 750 kHz | 4 | 2, 2, 1, 0 |
| 20 MHz | 18 MHz | 1 MHz | 5 | 3, 2, 2, 1, 0 |

Referring to Table 12, CE levels 0 and 1 may correspond to CEModeA of the eMTC, CE levels 2 and 3 may correspond to CEModeB. For the "Allowed Max. CE level from the outmostguard-band," the order of the values may be changed or some of the values may be changed in order to protect the legacy LTE UE or the NB-IoT UE from interference. Therefore, the BS needs to deliver the information about the limitation of the CE level of the corresponding anchor carrier to the NB-IoT UE before the NB-IoT UE starts random access. The information about the limitation of the CE level of the anchor carrier may be delivered through MIB1-NB, SIB1-NB, SIB2-NB, or a newly added SIB-NB, or may be delivered through RRC.

For the content of Table 12, access barring information for each CE level may be included in MIB1-NB of the corresponding anchor carrier in a similar manner to ab-Enabled-r13 of MIB1-NB. Information necessary for the operation of the NB-IoT UE may be included in SystemInformationBlockType14-NB or in SystemInformationBlockTypeX-NB, which is separately defined. The access barring information for each CE level may include a parameter for separately designating an uplink anchor carrier corresponding to the downlink anchor carrier according to each CE level. As another example, the access barring information about the anchor carrier may be configured according to the NRS-RSRP value, not the CE level, and the information necessary for the operation of the NB-IoT UE may be configured in the same manner as described above.

When the access barring information about the anchor carrier is configured differently according to the CE level or the NRS-RSRP value, the NB-IoT UE may adjust $P_{CMAX}$ or $P_{CMAX,c}$ and $P_{EMAX}$ or $P_{EMAX,c}$ according to the configuration of the corresponding anchor carrier and increase the repetition number, or move to an anchor carrier that satisfies $P_{CMAX}$ or $P_{CMAX,c}$ and $P_{EMAX}$ or $P_{EMAX,c}$ among other anchor carriers designated in access barring.

When the transmit power of the NB-IoT UE reconfigured by the above-described method exceeds $P_{CMAX}$ or $P_{CMAX,c}$ and $P_{EMAX}$ or $P_{EMAX,c}$, the CE level may be raised. If the channel indicated by the transmitted DL grant or UL grant is assigned a sufficiently small repetition number as to be transmitted while the link direction of in-band LTE remains unchanged, it may be dynamically indicated in the DL grant or UL grant.

In addition, the BS may configure multiple NB-IoT carriers in the guard-band in consideration of interference of in-band LTE, and may selectively use an NB-IoT carrier among the configured NB-IoT carriers according to the transmitted NB-IoT channel or transmit power. For example, anchor carriers that include periodically transmitted channels such as NPSS, NSSS, NPBCH, and SIB1-NB are assigned to a guard-band farthest from the in-band, and the NPDCCH and NPDSCH, which are transmitted intermittently, may be allocated to a frequency closer to the in-band than the anchor carrier including a channel that is periodically transmitted.

In addition, the maximum repetition number of the NB-IoT carrier positioned in a guard-band close to the in-band may be limited so as to be less than or equal to a predetermined value. The same limitation may be applied to the uplink operation.

4.4. Fourth Proposal: "Method of Allocating Resources to the Guard-Band Anchor Carrier on the in-Band Anchor Carrier"

In the type-2 frame structure for TDD, the number of downlink and uplink subframes is limited according to the uplink/downlink configuration, and it may be difficult to define all operations of the NB-IoT UE according to various uplink/downlink configurations. Therefore, in-band signals and channels carrying only downlink synchronization and basic system parameters may be transmitted in a specific downlink subframe, regardless of the uplink/downlink configurations. For example, the NPSS, NSSS, and NPBCH may be transmitted in downlink subframes 0 and 5 and DwPTS 1 and 6. In this case, information about the NPBCH may be transmitted such that the NB-IoT UE can expect an NB-IoT operation at a specific frequency of the guard-band. For example, the NB-IoT UE may acquire downlink synchronization through the NPSS and the NSSS on the in-band anchor carrier, and may identify that the corresponding cell is a TDD system, using the information about the NPBCH. In addition, the NB-IoT UE may move to a new anchor carrier configured at a specific frequency of the indicated guard-band to perform the proposed guard-band NB-IoT operation. Here, the new anchor carrier configured in the guard-band may be referred to as a second anchor carrier for simplicity. The second anchor carrier may not conform to the channel raster offset condition of the existing anchor carrier. That is, similar to the NB-IoT carrier, which may be configured as a non-anchor carrier, the position of the second anchor carrier may be indicated at any frequency (or a frequency limited to a specific range according to the size of the guard-band). The following enumerated pieces of information may be transmitted on the NPBCH or another channel such as SIB1-NB. However, since the number of subframes which are usable as downlink subframes at any time is limited regardless of the uplink/downlink configurations, it may be preferable to transmit such pieces of information on the NPBCH:

a. a field (of 1 bit) for specifying the TDD system;
b. a field containing frequency information about guard-band anchor carrier:
  i) a field (of N bits) for specifying the EARFCN of the guard-band anchor carrier;
  ii) a field (of 2 bits) for specifying information about the system bandwidth of a corresponding cell—5 MHz or higher in Table 11; and
  iii) a field (3 or fewer bits) for specifying the position of the relative position of the NB-IoT carrier within the guard-band of the cell.

For example, the NB-IoT UE may determine that the anchor carrier is in the in-band mode of the TDD system based on the above-listed information. In the case where the NB-IoT UE does not support the TDD in-band mode but supports only the proposed TDD guard-band mode, the NB-IoT UE may move to the second anchor carrier of the indicated guard-band. The NPBCH that the NB-IoT BS performing the proposed operation in the TDD guard-band transmits using the second anchor carrier of the guard-band may be configured with an MIB-NB different from the above-listed information. For example, operationModeInfo may be designated as the guard-band mode, and the remaining 3 bits except 2 bits of rasterOffset in the Guardband-NB may contain information indicating that the cell is in the TDD guard-band mode.

4.5. Fifth Proposal: "Method of Allocating Resources to a Guard-Band Non-Anchor Carrier on an in-Band Anchor Carrier"

Unlike the fourth proposal, the fifth proposal relates to a method of performing NB-IoT operation by allocating a non-anchor carrier to a specific frequency of a guard-band. This method may be applied to both the TDD NB-IoT UEs (type-C) (e.g., NB-IoT UEs of LTE Release 15 or a later version) and the NB-IoT UEs (type-B) of LTE Release 14 or earlier versions, which do not support TDD. The NB-IoT UEs of LTE Release 14 may perform an operation of receiving a paging signal and a RACH operation on a non-anchor carrier. For example, in the case where there are sufficient downlink and uplink subframes according to the uplink/downlink configuration and thus the UE can enter the RRC_CONNECTED state, various embodiments according to the fifth proposal may be applied even to the NB-IoT UEs (type-A) of LTE Release 13. Hereinafter, the operation of the proposed TDD guard-band non-anchor carrier according to each type of UEs will be described in detail.

1) Type-A

The NB-IoT UE of LTE Release 13 may perform the random access procedure only on the anchor carrier, and a non-anchor carrier configuration may be established in the RRC_CONNECTED state only through CarrierConfigDedicated-NB included in PhysicalConfigDedicated-NB in RadioResourceConfigDedicated-NB. Therefore, the operation of the TDD guard-band non-anchor carrier of the type-A UE may be supported by the previously defined specifications up to LTE Release 13 depending on the scheduling of the BS. However, the type-A UE should be configured to perform the reception operation regardless of the TDD/FDD RF bands, and cannot employ dynamic power control according to the TDD in-band uplink/downlink configuration as disclosed in the third proposal. However, it may be implemented such that interference between the legacy in-band LTE and the guard-band NB-IoT is minimized according to the scheduling of the BS.

2) Type-B

The NB-IoT UE of LTE Release 14 may perform an operation of receiving a paging signal and a RACH operation on a non-anchor carrier. To this end, the UE may receive system information including a downlink non-anchor carrier list for receiving the paging signal and a non-anchor carrier for the RACH. In particular, since the RACH is supported on the non-anchor carrier even in the RRC_IDLE state, the type-B UE is allowed to enter the RRC_CONNECTED state by decoding the MIB-NB and SIB messages and performing the RACH operation on the non-anchor carrier after acquiring synchronization through a downlink channel. Like the Type-A UE, the type-B UE should be configured to perform the reception operation regardless of the TDD/FDD RF bands, and cannot employ dynamic power control according to the TDD in-band uplink/downlink configuration as disclosed in the third proposal. However, it may be implemented such that interference between the legacy in-band LTE and the guard-band NB-IoT is minimized according to the scheduling of the BS.

3) Type-C

The type-C NB-IoT UE may support both type-A and type-B operations and support even the first and fourth proposals disclosed above. As described above, since there may be some limitations on type-A and type-B operations in terms of transmit power control and the like, the TDD guard-band non-anchor carrier of type-C needs to be configured independently of the TDD guard-band non-anchor carriers of type-A and type-B. For example, the type-C UE needs to transmit a message for identifying whether the TDD guard-band non-anchor carrier configuration is for type-A and type-B or for type-C. To this end, some reserved bits may cannot be interpreted by the existing type-A and type-B UEs may be used.

The following information is necessary for Type-C TDD guard-band non-anchor carrier configuration:

a. the entirety or part of the pieces of information listed in the first to fourth proposals;

b. a cross-combination of the pieces of information listed in the first to fourth proposals; and c. a flag indicating TDD guard-band operation based on FDD guard-band NB-IoT.

The pieces of information a to c listed above may be at least part of the Type-C TDD guard-band non-anchor carrier configuration.

In addition, methods for transmitting information about type-C TDD guard-band non-anchor carrier configuration may include using reserved bits, configuring a new SIB, configuring a UE-specific message, and interpreting and applying the messages of Type-A, Type-B, and Type-C. Each method will be described in detail below.

1) Using Reserved Bits

If the number of reserved bits is not sufficient, information about the type-C TDD guard-band non-anchor carrier configuration may be transmitted by being divided into the reserved bits of the MIB-NB and the SIB. If a part of the information is incomplete, the UE will not support the TDD guard-band non-anchor carrier mode. In addition, transmitting the information about the type-C TDD guard-band non-anchor carrier configuration by dividing the information is allowed only within a specific time interval. For example, the information generated at time t may be transmitted in a divided on matter in time interval T from time t. If the time is not in the time interval, may be divided and transmitted in a specific time interval regardless of whether the information is updated. The specific time may be predefined by the specification or may be transmitted to the NB-IoT UE through a cell common message.

2) Configuring a New SIB

In order to deliver the information about the type-C TDD guard-band non-anchor carrier configuration, a newly designed SIB may be scheduled using a part of the reserved bits of the MIB-NB or a part of the reserved bits of the SIB1. Alternatively, it may be delivered by a scheduling method predefined in the specification.

3) Configuring a UE-Specific Message

The method of configuring a UE-specific message may be applied only to UEs in the RRC_CONNECTED state. When a UE is switched to the RRC_IDLE state, the information about the TDD guard-band non-anchor carrier configuration may not be discarded, but may be reused later in a process for RRC_CONNECTED. In addition, unlike the two methods described above, information about another TDD guard-band non-anchor carrier configuration may be received in the indicated TDD guard-band anchor carrier.

4) Interpreting and Applying Type-A, Type-B, and Type-C Messages.

The Type-B UE may receive and decode all TDD guard-band non-anchor carrier configuration information of Type-A and Type-B, but may preferentially perform the Type-A operation UE-specifically configured by RRC. The Type-C UE may also receive and decode all TDD guard-band non-anchor carrier configuration information of Type-A and Type-B. Here, in the TDD guard-band non-anchor carrier configuration information, a UE-specifically transmitted value is applied in preference to a cell-commonly transmitted value. In addition, when there is a plurality of pieces of UE-specifically transmitted configuration information or cell-commonly transmitted configuration information, Type-C may be applied in preference to the other types.

5. Configuration of Devices

Figure 17:
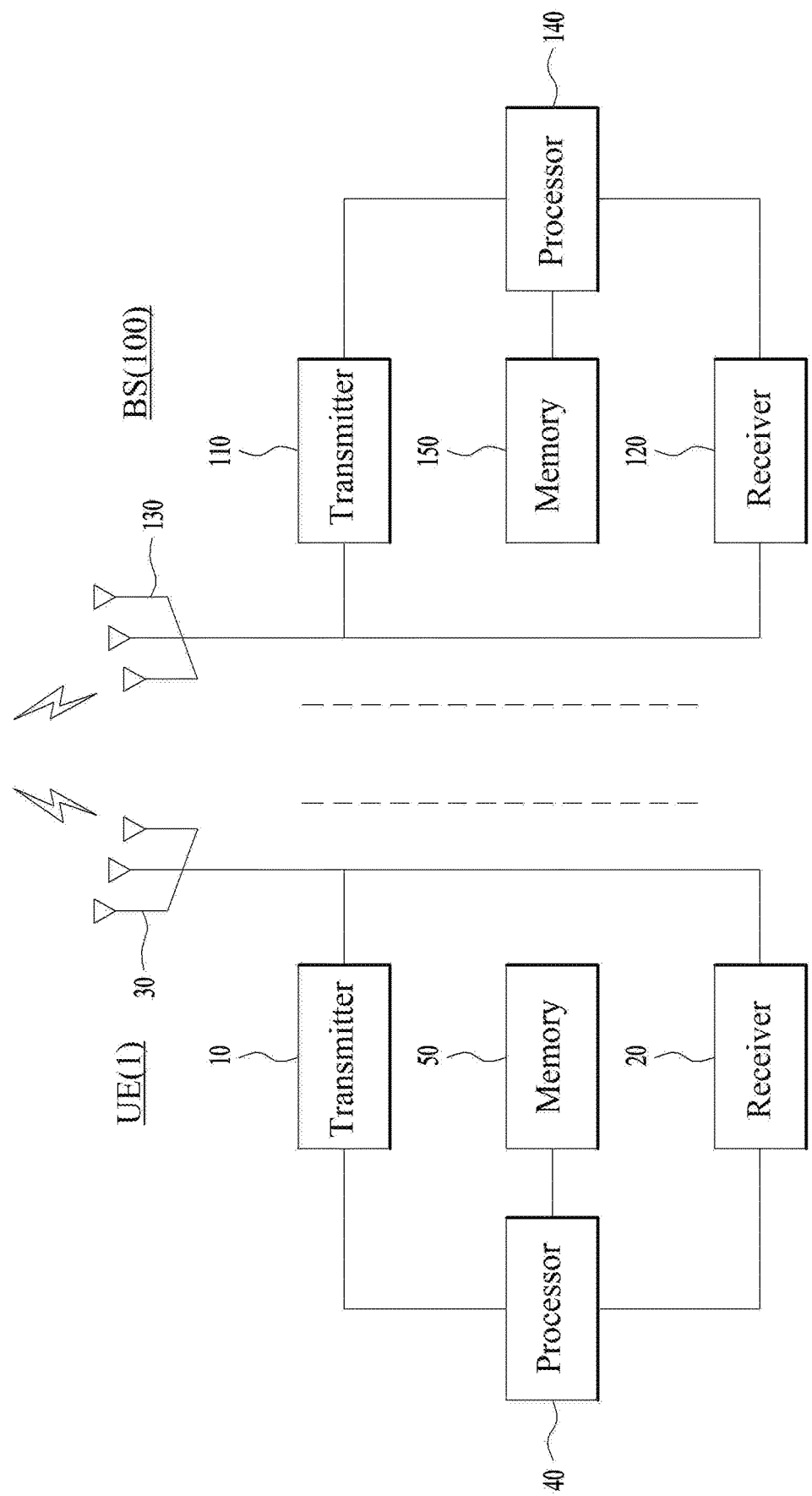
FIG. 17 is a diagram illustrating configuration of a UE and a BS according to an embodiment.

FIG. 17 is a diagram illustrating configuration of a UE and a BS according to an embodiment.

UE 1 and BS 100 shown in FIG. 17 may perform signal transmission/reception operations between the UE and the BS illustrated in FIGS. 1 to 16.

The UE 1 according to the embodiment may operate as a transmitting terminal on uplink and a receiving terminal of downlink. In addition, the BS 100 according to the embodiment may operate as a receiving terminal on uplink and a transmitting terminal on downlink.

Each of the UE 1 and the BS 100 according to the embodiment may include a transmitter 10, 110, a receiver 20, 120, and a processor 40, 140. However, the UE 1 and the BS 100 may be implemented by more components than the illustrated components, or two or more components thereof may be combined and implemented as one component. For example, referring to FIG. 17, the UE 1 and the BS 100 may include a memory 50, 150 and an antennas 30, 130 in addition to the transmitter 10, 110, the receiver 20, 120, and the processor, wherein the transmitter 10, 110 and the receiver 20, 120 may be combined and implemented as one transceiver. Hereinafter, the components will be described one by one.

According to an embodiment, the transmitters 10 and 110 and the receivers 20 and 120 may control transmission and reception of information, data, and/or messages, and the antenna 30, 130 may transmit information, data, and/or messages transmitted from the transmitter 10, 100, or transmit received information, data, and/or messages transmitted to the receiver 20, 120.

The processors 40 and 140 control the overall operations of the UE 1 and the BS 100, respectively.

The processor 40 of the UE 1 according to the embodiment control the receiver 20 to receive, from the BS 100, configuration information for configuring an operation of the UE 1 according to a first communication system, acquire transmit power information about a downlink signal of the first communication system based on the configuration information, and control the receiver 20 to receive a downlink signal from the BS 100 based on the transmit power information.

In addition, the processor 40 of the UE 1 according to the embodiment may adjust the transmit power of an uplink signal of the first communication system based on the configuration information, and control the transmitter 10 to transmit the uplink signal having the adjusted transmit power to the BS 100.

The processor 140 of the BS 100 according to the embodiment may control the transmitter 110 to transmit, to the UE 1, configuration information for configuring an operation of the UE 1 according to the first communication system, adjust the transmit power of the downlink signal of the first communication system based on the configuration information, and control the transmitter 110 to transmit the downlink signal having the adjusted transmit power to the UE 1. In addition, when a second communication system is configured to operate on uplink in the in-band, the processor 140 of the BS 100 according to the embodiment of the present invention may lower the transmit power of the downlink signal of the first communication system as the spacing between the downlink carrier and the in-band carrier of the first communication system is widened.

Here, the downlink signal and the uplink signal may be transmitted through the downlink carrier and the uplink carrier of the first communication system, respectively, wherein the downlink carrier and the uplink carrier may be allocated in the guard-band of the in-band and guard-band configured for the second communication system, using the Frequency Division Duplex (FDD) scheme. For example, when the bandwidth allocated to the second communication system is 20 MHz and the in-band operating according to the second communication system is 18 MHz, the guard-band may be 2 MHz excluding 18 MHz from 20 MHz allocated to the second communication system. For example, the first communication system may be an NB-IoT system and the second communication system may be an LTE system. However, embodiments are not limited thereto.

According to an embodiment, the guard-band may include a low guard-band and a high guard-band. For example, as described above, when the band allocated to the second communication system is 20 MHz and the in-band is 18 MHz, the low guard-band may 1 MHz in a frequency band lower than the in-band, and the high guard-band may be 1 MHz in a frequency band higher than the in-band.

In addition, according to an embodiment, each of the low guard-band and the high guard-band may include a first band, a second band, and a third band. Here, the second band may be a band for allocating one or more carriers of the first communication system, the first band may be a guard-band configured between the second band and the outside of the band allocated to the second communication system, and the third band may be a guard-band configured between the second band and the in-band. For example, the first band may be a guard-band that is additionally configured to reduce the effect of the Adjacent Channel Leakage Ratio (ACLR) on the outside of the band allocated to the second communication system, and the third band may be a guard-band that is additionally configured to reduce interference between the carrier of the first communication system and the in-band.

Further, according to an embodiment, the carriers of the first communication system allocated to the second band may include one or more downlink carriers and one or more uplink carriers. For example, the downlink carriers may be allocated to the second band of the low guard-band, and the uplink carriers may be allocated to the second band of the high guard-band. As another example, a downlink carrier and an uplink carrier may be allocated to the second band of the low guard-band so as to be adjacent to each other, or may be allocated to the second band of the high guard-band so as to be adjacent to each other. For example, the downlink carrier and the uplink carrier may be configured within the second band of the low guard-band or the second band of the high guard-band so as to maintain a constant offset.

In addition, according to an embodiment, the carriers of the first communication system may be sequentially allocated within the second band, starting at a frequency far from the in-band in order to minimize the effect of cross-link interference with the in-band.

The configuration information according to an embodiment may include at least one of uplink/downlink configuration information about the in-band, and configuration information about a special subframe, information about a transmission direction of a signal of the first communication system, attribute information about a physical channel transmitted in the guard-band, a coverage enhancement (CE) level, and an NRS-RSRP. Here, the attribute information about the physical channel may include information about at least one of a type, a configuration, content, and a repetition number of the physical channel. In addition, the type of physical channel may include NPRACH, NPUSCH format 1, and NPUSCH format 2, and the content of the physical channel may include information indicating whether the channel is UE data or system information. However, embodiments are is not limited thereto.

The memories 50 and 150 according to the embodiment may store a program for processing and control of the processors 40 and 140, and also store data processed by the processors 40 and 140. The memories 50 and 150 may be located inside or outside the processors 40 and 140, and may exchange data with the processors 40 and 140 by various known means.

The transmitters 10 and 110 and the receivers 20 and 120 of the UE 1 and the BS 100 according to the embodiment may perform at least one of a packet modulation and demodulation function for transmitting data, a function of high speed packet channel coding, a function of orthogonal frequency division multiple access (OFDMA) packet scheduling, a function of time division duplex (TDD) packet scheduling, and/or a function of channel multiplexing, but are not limited thereto. In addition, according to an embodiment, the UE 1 and the BS 100 may further include a low-power radio frequency (RF)/intermediate frequency (IF) module.

The UE 1 according to the embodiment may include a Personal Digital Assistant (PDA), a cellular phone, a Personal Communication Service (PCS) phone, and a Global System for Mobile (GSM) phone, a Wideband CDMA (WCDMA) phone, a Mobile Broadband System (MBS) phone, a Hand-Held PC, a notebook PC, a smartphone, or a Multimode-Multiband (MM-MB) terminal, but is not limited thereto. For example, the smartphone may combine the advantages of a mobile communication terminal and the PDA and may refer to a terminal integrating the schedule management function and data communication functions such as fax transmission/reception and Internet access, which are the functions of the PDA, into the mobile communication terminal. In addition, the MM-MB terminal may refers to a terminal that is provided with a built-in multi-modem chip to operate in both portable Internet systems and other mobile communication systems (e.g., Code Division Multiple Access (CDMA) 2000 systems, wideband CDMA (WCDMA) systems, etc.).

Embodiments of the present invention may be implemented by various means. For example, embodiments of the present invention may be implemented by hardware, firmware, software, or a combination thereof.

When implemented by hardware, the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, or the like, but is not limited thereto.

When implemented by firmware or software, the present invention may be implemented in the form of a module, a procedure, or a function that performs the above-described functions or operations. For example, a program including a module, a procedure, or a function that performs the above-described functions or operations may be stored in the memories 50 and 150 and executed by the processors 40 and 140.

Those skilled in the art will appreciate that the present invention may be carried out in other specific forms than those set forth herein without departing from the spirit and essential features of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. In addition, claims that are not explicitly cited by each other in the appended claims may be presented in combination as an embodiment of the present invention or included as a new claim by a subsequent amendment after the application is filed.

INDUSTRIAL APPLICABILITY

Embodiments of the present invention are applicable to various radio access systems. The radio access systems may include, for example, 3rd generation partnership project (3GPP) systems or 3GPP2 systems, but are not limited thereto. Embodiments of the present invention are applicable not only to the above-mentioned radio access systems, but also to all technical fields to which the above-described radio access systems are applied. Furthermore, the present invention is applicable to an mmWave communication system using an ultra high frequency band.

The invention claimed is:

1. A method for transmitting and receiving, by a terminal, a signal to and from a base station in a wireless communication system, the method comprising:
receiving, from the base station, configuration information for configuring an operation of the terminal according to a first communication system;
acquiring transmit power information about a downlink signal of the first communication system based on the configuration information; and
receiving the downlink signal from the base station based on the transmit power information,
wherein the downlink signal is transmitted through a downlink carrier of the first communication system,
wherein the downlink carrier is allocated in a specific guard-band between an in-band and a guard-band configured for a second communication system, using a Frequency Division Duplex (FDD) scheme,
wherein the guard-band comprises a low guard-band and a high guard-band,
wherein each of the low guard-band and the high guard-band comprises a first band, a second band, and a third band, and
wherein:
the second band is a band for allocating carriers of the first communication system including the downlink carrier,
the first band is a guard-band configured between the second band and a band allocated to the second communication system, and
the third band is a guard-band configured between the second band and the in-band.

2. The method of claim 1, wherein the first communication system is a Narrowband Internet of Things (NB-IoT) system, and the second communication system is a Long Term Evolution (LTE) system operating according to a Time Division Duplex (TDD) scheme.

3. The method of claim 1, wherein the carriers of the first communication system comprise the downlink carrier and an uplink carrier,
wherein the downlink carrier and the uplink carrier are allocated to the low guard-band and the high guard-band, respectively, or are allocated in the low guard-band or the high guard-band so as to be adjacent to each other.

4. The method of claim 1, wherein the carriers of the first communication system are sequentially allocated within the second band, starting at a frequency far from the in-band.

5. The method of claim 1, wherein the configuration information comprises at least one of uplink/downlink configuration information about the in-band, configuration information about a special subframe, transmission direction information about a signal of the first communication system, attribute information about a physical channel transmitted in the guard-band, a Coverage Enhancement (CE) level, and a Narrowband Reference Signal-Reference Signal Received Power (NRRS-RSRP).

6. The method of claim 5, wherein the attribute information about the physical channel comprises information about at least one of a type, a configuration, content, and a repetition number of the physical channel.

7. The method of claim 1, wherein transmit power of the downlink signal is adjusted by the base station,
wherein, when the second communication system is configured to operate on uplink in the in-band, transmit power of the downlink signal of the first communication system is reduced as a spacing between the downlink carrier of the first communication system and the in-band is widened.

8. The method of claim 1, further comprising:
adjusting transmit power of a uplink signal of the first communication system based on the configuration information; and
transmitting the uplink signal having the adjusted transmit power to the base station.

9. A method for transmitting, by a base station, a signal to a terminal in a wireless communication system, the method comprising:
transmitting, to the terminal, configuration information for configuring an operation of the terminal according to a first communication system;

adjusting transmit power of a downlink signal of the first communication system based on the configuration information; and transmitting, to the terminal, the downlink signal having the adjusted transmit power, wherein the downlink signal is transmitted through a downlink carrier of the first communication system, wherein the downlink carrier is allocated in a guard-band between an in-band and a guard-band configured for a second communication system, using a Frequency Division Duplex (FDD) scheme, wherein the guard-band comprises a low guard-band and a high guard-band, wherein each of the low guard-band and the high guard-band comprises a first band, a second band, and a third band, wherein:
the second band is a band for allocating carriers of the first communication system including the downlink carrier;
the first band is a guard-band configured between the second band and a band allocated to the second communication system; and
the third band is a guard-band configured between the second band and the in-band.

10. A terminal for transmitting and receiving a signal to and from a base station in a wireless communication system, the terminal comprising:

a transceiver; and a processor operatively connected to the transceiver, wherein the processor is configured to:

control the transceiver to receive, from the base station, configuration information for configuring an operation of the terminal according to a first communication system;

acquire transmit power information about a downlink signal of the first communication system based on the configuration information; and control the transceiver to receive the downlink signal from the base station based on the transmit power information, wherein the downlink signal is transmitted through a downlink carrier of the first communication system, wherein the downlink carrier is allocated in a guard-band between an in-band and a guard-band configured for a second communication system, using a Frequency Division Duplex (FDD) scheme, wherein the guard-band comprises a low guard-band and a high guard-band, wherein each of the low guard-band and the high guard-band comprises a first band, a second band, and a third band, wherein:
the second band is a band for allocating carriers of the first communication system including the downlink carrier,
the first band is a guard-band configured between the second band and a band allocated to the second communication system, and
the third band is a guard-band configured between the second band and the in-band.

11. A base station for transmitting a signal to a terminal in a wireless communication system, comprising:

a transmitter; and a processor operatively connected to the transmitter;

wherein the processor is configured to:

control the transmitter to transmit, to the terminal, configuration information for configuring an operation of the terminal according to a first communication system;

adjust transmit power of a downlink signal of the first communication system based on the configuration information; and control the transmitter to transmit, to the terminal, the downlink signal having the adjusted transmit power, wherein the downlink signal is transmitted through a downlink carrier of the first communication system, wherein the downlink carrier is allocated in a guard-band between an in-band and a guard-band configured for a second communication system, using a Frequency Division Duplex (FDD) scheme, wherein the guard-band comprises a low guard-band and a high guard-band, wherein each of the low guard-band and the high guard-band comprises a first band, a second band, and a third band, wherein:
the second band is a band for allocating carriers of the first communication system including the downlink carrier;
the first band is a guard-band configured between the second band and a band allocated to the second communication system; and
the third band is a guard-band configured between the second band and the in-band.

* * * * *